United States Patent [19]

Misawa et al.

[11] Patent Number: 5,041,852
[45] Date of Patent: Aug. 20, 1991

[54] CAMERA SHAKE CORRECTION SYSTEM

[75] Inventors: Atsushi Misawa; Kazuo Ikari; Satoshi Ueda, all of Minato, Japan

[73] Assignee: Fjui Photo Film Co., Ltd., Kanagawa, Japan

[21] Appl. No.: 599,578

[22] Filed: Oct. 18, 1990

[51] Int. Cl.$^5$ .............................................. G03B 15/00
[52] U.S. Cl. ...................................... 354/76; 354/295
[58] Field of Search ........................... 354/75, 76, 295

[56] References Cited

U.S. PATENT DOCUMENTS 4,448,510  5/1984  Murakoshi ..................... 354/289.12

Primary Examiner—Michael L. Gellner
Attorney, Agent, or Firm—Sughrue, Mion, Zinn, Macpeak & Seas

[57] ABSTRACT

A camera shake correction system which corrects the shaking of a picture image caused by the shake of a camera. In the camera shake correction system, a mirror is supported in front of a taking lens in such a manner that the mirror is free to incline about an angle of 45° with respect to the optical axis of the taking lens, and the mirror is inclined at a half of the angular speed of the camera in the opposite direction to the shaking direction of the camera in accordance with the detection output of a shake sensor for detecting the shake of the camera, thereby stabilizing an object light incident on the image pickup surface of the camera.

18 Claims, 22 Drawing Sheets

FIG. 20(A) A/D CONVERTER

FIG. 20(B) DATA PROCESSING

FIG. 20(C) PULSE OUTPUT

CAMERA SHAKE CORRECTION SYSTEM

BACKGROUND OF THE INVENTION

1. Field of the Invention

The present invention relates to a camera shake correction system and, in particular, to such shake correction system which drives at least a part of optical members forming a photographing optical system of a camera to stabilize an object light incident on an image pickup surface through the photographing optical system.

2. Description of the Related Art

As a conventional camera shake correction system of the above-mentioned type, there has been known a correction system in which a mirror is disposed inclinably within an optical system of a taking lens to thereby refract an object light about 90°, and the mirror is inclined to thereby stabilize the object light incident on the image pickup surface of a camera.

Also, as a mechanism for supporting the above-mentioned mirror, there is used a gimbal mechanism or the like which has two rotary shafts respectively disposed on the X and Y axes and independent from each other. That is, the mirror can be supported by such mechanism such that the mirror can be inclined in all directions.

On the other hand, there is also known another type of correction system which does not use the above-mentioned mirror, but uses a gimbal mechanism or the like to support inclinably the whole taking lens or part of lenses forming the taking lens, and drives the thus supported lens or lenses to thereby stabilize the object light incident on the image pickup surface.

For example, according to a camera shake correction system shown in FIG. 27, a correction optical system 1 is driven in a yawing direction (X direction) and in a pitching direction (Y direction) respectively by drive parts 2A and 2B to surely stabilize an object light on an image surface 3 by means of the movements of the correction optical system 1 corresponding to the camera shake by a photographer (Japanese Patent Publication No.2-96621).

In particular, according to the above-mentioned camera shake correction system, in a lens barrel 4 there are provided two angular speed sensors 5A and 5B which are respectively used to detect angular speeds in the X and Y directions. The detection outputs of the two sensors 5A and 5B are then time integrated by integration circuits 6A and 6B respectively to thereby find the angles of shake of a camera in the X and Y directions thereof, and signals (the control target values of the correction optical system) indicating these shake angles are then output to points of addition 7A and 7B, respectively.

To the input of the addition points 7A and 7B, there are being applied from correction optical position detection sensors 8A and 8B the signals that indicate the current positions of the correction optical system 1, as feedback values. The addition points 7A and 7B output to drive circuits 9A and 9B signals indicating a deviation between these two input signals, respectively. In order to make the above deviation 0, the drive circuits 9A and 9B amplify input signals from a point of addition 16 up to suitable voltage signals and output the voltage signals to the drive parts 2A and 2B. Responsive to the input signals, the drive parts 2A and 2B respectively drive the correction optical system 1 in the X and Y directions to thereby stabilize a picture image on the image surface 3.

In the camera shake correction systems of the above-mentioned mechanical correction type, as the drive means for driving the optical members such as the above-mentioned mirror, lenses and the like, there is often proposed an electromagnetic drive means such as a voice coil or the like. However, such electromagnetic drive means is limited in the response speed thereof and consumes a great amount of electric power.

On the other hand, there is also known another type of camera shake correction system which uses a piezo-electric element as the drive means to drive the above-mentioned optical member.

And, as a sensor to detect the shake of a camera, there is used an angular speed sensor which utilizes a Coriolis force. In general, however, it is known that the output of the angular speed sensor of this type is proportional to angular speeds and includes a drift component. That is, due to the drift component included in the sensor output of the angular sensor, a camera shake correction operation is carried out even though the camera remains still, which gives rise to generation of a distorted image surface in synchronization with the drift component, resulting in the hard-to-see images.

Thus, in order to remove the above-mentioned drift component, conventionally, in the angular speed sensor there is provided an insensitive area which corresponds to the amount of drift.

However, due to the fact that in the conventional camera shake correction system the mirror is disposed within the optical system of the taking lens, the taking lens must be designed in consideration of the mirror and thus the currently available taking lens cannot be used. Also, the conventional mirror support mechanism utilizing the gimbal mechanism is not only complicated in structure and large in size, but also due to play of the bearing portion of such mechanism and accurate correction cannot be realized. Further, when an insensitive area to remove the influence of the drift component is provided in the angular speed sensor for detection of camera shake by use of the Coriolis force, it is impossible to detect slight angular speeds contained in the insensitive area, so that it is hard to correct slight camera shake.

In addition, when the piezo-electric element is used as the drive means to drive the optical members such as the mirror and the like, as shown in FIG. 27, a feedback control is necessary because the piezo-electric element has a so called hysteresis characteristic in which an applied voltage is not proportional to the shift thereof. This requires an angle sensor to obtain a feedback value and causes the control system to be complicated.

On the other hand, when the piezo-electric element is controlled by an open loop, for example, if a camera is moved successively in one direction as in a camera panning operation, then the optical member, just after such movements, reaches the end terminal of the movable range thereof and is caused to stop there. Thus, in this condition, if any camera shake occurs, then the optical member is limited in its movement to the thus stopped side so that a sufficient correction effect cannot be obtained.

In order to solve the above problem, there can be suggested a method in which a parallel resistance is inserted in the piezo-electric element to gradually escape electric charges. Even in this case, however, the optical member cannot move back to the center of the movable range thereof because of the hysteresis characteristic of the piezo-electric element. That is, this method cannot solve the above-mentioned problem completely.

Further, the conventional camera shake correction system shown in FIG. 27 has two independent control systems in the X and Y directions. Due to the two control systems, this conventional camera shake correction system costs substantially double a correction system using a single control system.

SUMMARY OF THE INVENTION

The present invention aims at eliminating the drawbacks found in the above-mentioned conventional camera shake correction systems.

Accordingly, it is an object of the invention to provide a camera shake correction system which allows the design of a taking lens without taking into consideration a camera shake correction mirror, can simplify a mirror support mechanism, can be compact in size and can be reduced in cost, and produces no play in a mirror support portion for accurate positioning.

It is another object of the invention to provide a camera shake correction system which can simplify the structure of a control system of a piezo-electric element to drive a camera shake correction optical member, allows common use of main parts of two, that is, X- and Y-direction control systems for reduced costs, and can return the optical member to the center of the movable range thereof while a camera is still.

It is still another object of the invention to provide a camera shake correction system which uses a sensor lower in cost than an angular sensor utilizing a Coriolis force without increasing its size.

It is yet another object of the invention to provide a camera shake correction system which can remove a drift component contained in the output of an angular speed sensor utilizing a Coriolis force and also can detect a slight angular speed so as to realize a highly accurate camera shake correction.

In order to achieve the above objects, according to the invention, there is provided a camera shake correction system which comprises: a mirror; a mirror support mechanism for inclinably supporting the mirror in front of a taking lens of a camera about an angle of substantially 45° with respect to the optical axis of the taking lens; a mirror drive means for inclining the mirror; a sensor for detecting the shake of the camera; and, a control means, in accordance with the detection output of the shake detection sensor, for controlling the mirror drive means so that an object light incident on the image pickup surface of the camera can be stabilized.

Also, the above-mentioned mirror support mechanism is characterized by a chassis fixed in front of the taking lens at an angle of substantially 45° with respect to the optical axis of the taking lens; a ball interposed between the back surfaces of the mirror and the chassis; and a spring member for pressing the mirror against the chassis through the ball by means of its resilient force.

Further, the above-mentioned shake detection sensor is characterized by an angular speed sensor using a Coriolis force; an average value detection means for finding an average value of the outputs of the angular speed sensor within a predetermined period of time, which is shorter than the cycle of a drift component contained in the output of the angular speed sensor and longer than the cycle of the angular speeds of the shake of the camera to be detected; and, a subtraction means for subtracting the average value found by the average value detection means from the output of the angular speed sensor.

The shake detection sensor is also characterized in that it is an angular speed sensor which outputs a voltage signal proportional to the angular speed of the camera, and the control means is also characterized in that, in accordance with a voltage signal output from the angular speed sensor, it injects electric charges into the piezo-electric element so that the amount of injected electric charges a unit time is proportional to the voltage signal.

According to another aspect of the invention, there is provided a camera shake correction system which comprises: a mirror; a mirror support mechanism for inclinably supporting the mirror in front of a taking lens of a camera about an angle of substantially 45° with respect to the optical axis of the taking lens; a mirror drive means for inclining the mirror; a shake sensor having a photoelectric conversion element disposed in the neighborhood of the taking lens and an optical system for forming on the photoelectric conversion element an image of an object light entering through the mirror; a control means for calculating the amount of movements of the object light per unit time formed on the photoelectric conversion element of the shake sensor in accordance with the detection output of the shake sensor, and controlling the mirror drive means so that the amount of the movements of the object light becomes 0.

According to still another aspect of the invention, there is provided a camera shake correction system in which at least part of optical members of a photographing optical system of a camera is arranged such that it is free to move, and the optical members can be driven to rotate in a first rotational direction (X direction) and a second rotational direction (Y direction) about two axes perpendicular to the optical axes of the optical members and also perpendicular to each other to thereby stabilize an object light incident on an image pickup surface through a photographing optical system, the camera shake correction system comprising: first and second piezo-electric elements for driving the optical members respectively in the X and Y directions; first and second angular speed sensors respectively for outputting first and second voltage signals proportional to the angular speeds in the camera X and Y directions; a signal process means for processing two systems in the X and Y direction's in a time sharing manner, the signal process means for inputting alternately at a given cycle first and second voltage signals respectively output from the angular speed sensor, for finding first and second information on the amount of injection of the electric charges, in accordance with the input first and second voltage signals, so that the amount of electric charges injected into the first and second piezo-electric elements per unit time can be proportional to the magnitudes of the first and second voltage signals, and for outputting the first and second electric charge injection amount information alternately; and first and second pulse charge injection means, responsive to input of the first and second electric charge injection amount information output from the signal process means, for continuously injecting into the first and second piezo-electric elements the pulse electric charges corresponding to the thus input first and second electric charge injection amount information until the next first and second electric charge injection amount information is input.

According to the yet another aspect of the invention, there is provided a camera shake correction system in which at least part of optical members of a photographing optical system of a camera are movably arranged and the optical members can be driven to stabilize an object light incident on an image pickup surface through the photographing optical system, the camera shake correction system comprising: a piezo-electric element for driving the optical members; an angular speed sensor for outputting a voltage signal proportional to the angular speed of the camera; decision means for deciding whether the voltage signal output from the angular speed sensor is less than a predetermined threshold value which requires no shake correction or not; and an electric charge injection means, when the voltage signal output from the angular speed sensor is decided to be equal to or greater than the predetermined threshold value, for injecting electric charges into the piezo-electric in accordance with the voltage signal in such a manner that the amount of injected electric charges per unit time is proportional to the magnitude of the voltage signal, and, when the voltage signal is decided to be less than the predetermined threshold value, for injecting slight electric charges into the piezo-electric element alternately.

According to the invention, due to the fact that a mirror for correcting camera shake is disposed in front of a taking lens, the taking lens can be designated without taking the mirror into consideration and a currently existing taking lens can be used. Also, according to the invention, a ball is interposed between the back surface of a mirror and a chassis and the mirror is free to move only in inclination, whereby the mirror can be pressed against the chassis by a spring member and thus can be supported. This allows the mirror to be inclined in all direction. Also, since the mirror is pressed against the chassis by the spring member, there can be produced no play in the mirror support portion, so that the mirror can be positioned accurately.

Also, according to another embodiment of the invention, in place of the angular speed sensor, there is provided a shake sensor which is used to detect the shake of angular speeds. In this shake sensor, an object light entering through a mirror can be formed on a photoelectric element and a detection output can be taken out from the photo-electric element. In this embodiment, a control means in adapted to sample the detection outputs of the shake sensor at a predetermined time interval, to compare and operate the thus sampled data to thereby find the amount of movements of the object light formed on the photo-electric element by the unit time, and then to control and drive the mirror so that the amount of movements of the object light can be always zero.

Further, the present invention utilizes the property of the piezo-electric element that its shift follows the amount of injected electric charges linearly, and controls the speed of the piezo-electric element by controlling the amount of injected electric charges per unit time by use of an open loop without having any feedback loop to thereby drive the optical member. Also, according to the invention, when the camera is still and the output of the angular speed sensor is less than a predetermined threshold value which requires no shake correction, slight electric charges are alternately injected into the piezo-electric element to thereby return the shift of the piezo-electric element to the center of the moving range thereof. Here, for stabilization of the object light, to control and enhance the response of the optical member with respect to the angular speed of the camera is more effective than to feedback control the position of the optical member in such a manner that the positions of the images before and after the camera shake are not changed. Accordingly, the above-mentioned open loop can also realize a good camera shake correction.

In addition, according to the present invention, by applying a time-sharing signal process technique to the two (that is, X- and Y-directions) independent control systems, these two control systems can be processed by a single signal. Also, the two pulse electric charge injection means respectively continue to inject the pulse electric charges into the piezo-electric element until the next electric charge injection amount information is input thereto from the signal process means. For these reasons, in spite of the time-sharing operation, the camera shake correction can be made successively in both of X- and Y-directions.

It should be noted here that the cycle of the screen shake, which makes indistinct the video images that have been photographed by an ordinary video camera and also for which a camera shake correction provides an outstanding effect, is on the order of 1/15 2 sec. Also, it is empirically found that the output voltage of an angular speed sensor of a tuning fork type or the like includes a voltage drift having a cycle ranging from 20 sec. to several tens sec.

For the above reasons, according to the invention, by finding the average value of the outputs of the angular speed sensor within a predetermined period of time which is longer the cycle of the above-mentioned camera shake (the angular speed to be detected) and shorter than the cycle of the voltage drift, only the drift component can be detected. Also, by subtracting the thus detected drift component from the output of the angular speed sensor, the drift component can be removed. By the way, in detecting the drift component, the number of averages, $M \times N$, are obtained as the number of samplings within the above-mentioned predetermined period of time. However, if the drift components are obtained each time the above-mentioned predetermined time has passed, then there is a possibility that there can be produced sudden variations in the drift components. For this reason, according to the present invention, each time the number, M, of the sensor outputs is sampled and the average value of the M samplings is calculated, the average value is substituted for the oldest average value of the "N" number of average values to find the newest average value of the "N" number of samplings, thereby detecting the drift component. Further, by detecting the drift component in this manner, the present invention can reduce the memory storage to a great extent when compared with the prior art in which the average of "$M \times N$" samplings is calculated each time the sensor output is sampled.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of a camera shake correction system according to the present invention with reference to the accompanying drawings.

Figure 1:
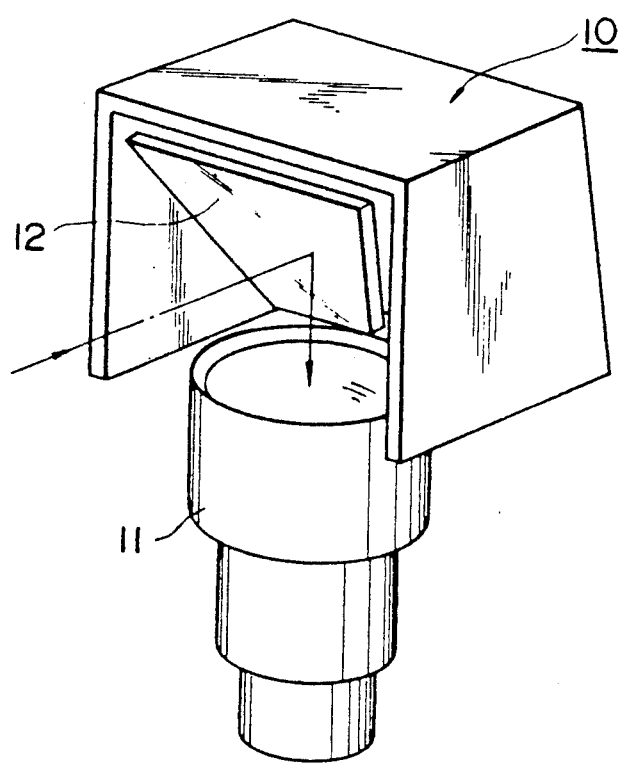
FIG. 1 is a general view of the whole structure of a camera shake correction system according to the invention.

Referring first to FIG. 1, there is shown a general view of the whole structure of a camera shake correction system according to the invention. The present camera shake correction system is disposed above (in front of) a taking lens 11 and, normally bends an object image 90° by means of a mirror 12 and thereafter guides the object image to the taking lens 11.

The mirror 12, as will be discussed later, is supported in such a manner that it can be slided freely in all directions. If a camera is inclined due to the shake caused by a photographer's hand, then the mirror 12 is inclined by a half of the angle of the camera shake in an opposite direction to the shake direction of the camera so as to correct the shaking of the image caused by the camera shake.

Figure 2:
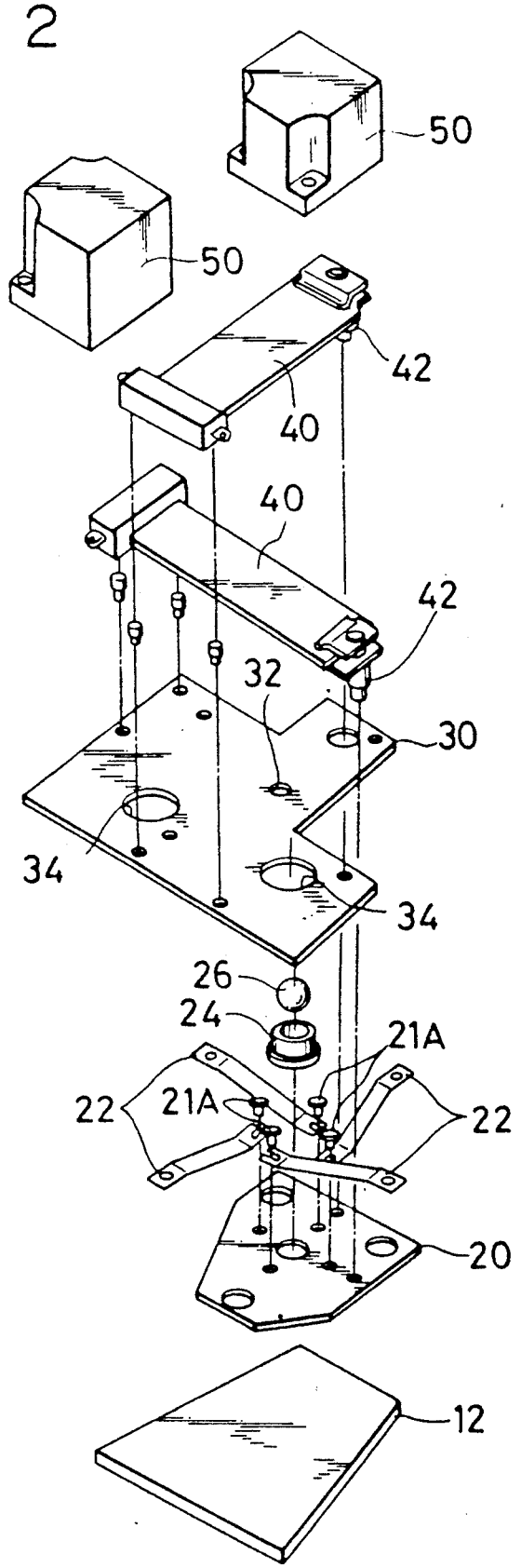
FIGS. 2 and 3 are, respectively, an exploded perspective view and a section view of a first embodiment of a camera shake correction system according to the invention.
Figure 3:
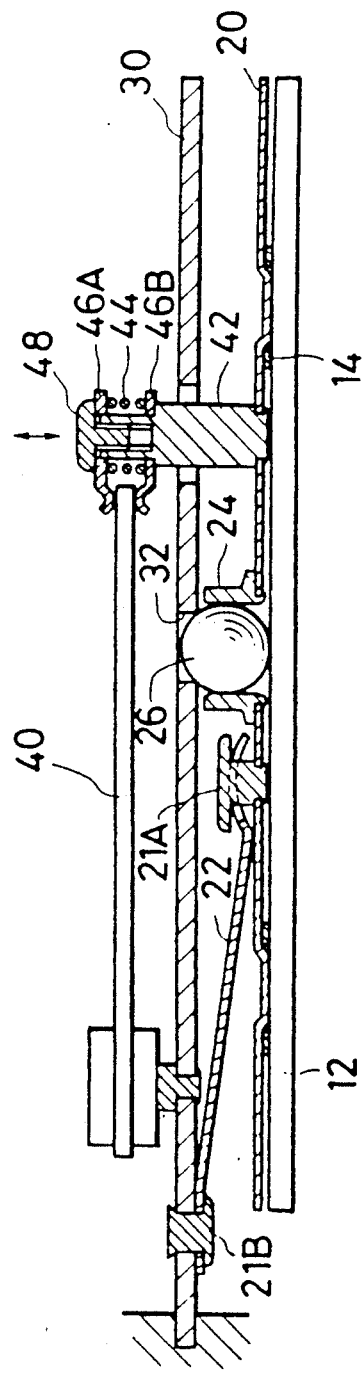

FIGS. 2 and 3 respectively show an exploded perspective view and a section view of a first embodiment of a camera shake correction system according to the invention, especially illustrating a mirror support mechanism and a drive mechanism.

In these figures, the mirror support mechanism is mainly composed of a mirror base plate 20, four plate springs 22, a ball collar 24, a ball 26, a chassis 30 and the like.

To the back surface of the mirror 12, as shown in FIG. 3, there is attached the mirror base plate 20 by means of an adhesive 14.

The mirror base plate 20 includes the ball collar 24 provided in the center portion thereof, four pins 21A arranged about the ball collar 24, and two drive pins 42, 42 respectively arranged in the positions of the two bottom angles of a right-angled, isosceles triangle with the center of the ball collar 24 as the vertical angle thereof.

The ball collar 24 is a cylindrical body having an inside diameter equal to the diameter of the ball 26, and stores the ball 26 therein in such a manner that the ball 26 can be rotated freely and a portion of the ball 26 projects out from the ball collar 24.

The chassis 30 has a hole 32 into which the above-mentioned portion of the ball 26 and, to the chassis 30, the four plate springs 22 are fixed by a pin 24B (see FIG. 3). Each of the four plate springs 22 fixed to the chassis 30 has a U-shaped notch in the tip end thereof and the tip end portions of the respective plate springs 22 are inserted into the pins 21A provided in the mirror base plate 20.

The mirror base plate 20 is pressed through the ball 26 against the chassis 30 by the four plate springs 22, and is maintained at a neutral position parallel to the chassis 30 by means of the forces of the plate springs.

Due to this, the mirror base plate 20, that is, the mirror 12 can be supported such that it can be inclined in all directions with respect to the chassis 30, but can be prevented from moving in the plane direction thereof. By the way, since the reflecting surface of the mirror 12 is shifted from the center of rotation of the mirror 12 when it is inclined, the reflecting surface of the mirror 12 is moved back and forth when the mirror 12 is inclined. However, the diameter of the ball 26 is small (on the order of 2~10 mm) and, therefore, if the thickness of the mirror 12 is small, then the amount of the movement to be corrected, itself, is small or on the order of 1°~3°. That is, the amount of the back and forth movement of the mirror reflecting surface is negligible. Besides, no mechanical play can be produced. In view of these, the present mirror support mechanism is able to realize a more accurate positioning than a gimbal mechanism.

On the other hand, the mirror drive mechanism is mainly composed of two bimorphs 40, 40 two drive pins 42, 42 and the like.

The two bimorphs 40, 40 are respectively arranged in a cantilevered manner on the chassis 30 in such a manner that they are parallel to the chassis 30 and they intersect substantially perpendicularly with each other. Also, the two bimorphs 40 and 40 are spaced from each other so that they cannot interfere with each other when drived.

The two driving pins 42, 42, as described before, are provided in the mirror base plate 20 and the tip ends of the pins respectively project out from the upper surface of the chassis 30. A pair of metal pieces 46A, 46B holding a coil spring between them are inserted into the leading or tip ends of the drive pins 42. Also, the metal pieces 46A and 46B are secured by a screw 48 so that they can hold the leading ends of the bimorphs 40 between them.

According to the mirror drive mechanism constructed in the above-mentioned manner, if a voltage is applied to the bimorph 40, then the leading end of the bimorph 40 is shifted according to the applied voltage and the drive pin 42 is moved in a direction of an arrow shown in FIG. 3 (in a vertical direction). Due to this, the clearance between they chassis 30 and the mirror 12 is caused to vary. That is, the mirror 12 is inclined with the center of the ball 26 as a reference. Also, by controlling the positions of the two drive pins 42, 42 in the vertical directions thereof by means of the two bimorphs 40, 40, the mirror 12 can be inclined by a desired angle in the X and Y directions, that is, in all directions.

In FIG. 2, reference numerals 50, 50 respectively designate angular speed sensors which are disposed on the chassis 30. The angular sensor 50 comprises an infrared light emitting diode, a position detector (SPD), a light projecting/receiving lens and the like. According to the angular sensor 50, an infrared light is projected from the infrared light emitting diode into the back surface of the mirror 12 through the light projecting/receiving lens and also through a hole 34 formed in the chassis 30, and the reflected light is then received through the hole 34 and the light projecting/receiving lens by the PSD.

The light receiving position of the PSD correspond to the inclination of the mirror 12 and, therefore, the inclination of the mirror 12 can be detected in accordance with the output of the PSD. Also, the two angular speed sensors 50, 50 respectively detect the inclinations of the mirror 12 in the X and Y directions therefore, separately, when the mirror 12 is inclined by the two bimorphs 40, 40.

Next, description will be given below of the control system for the above-mentioned bimorph 40.

Figure 4:
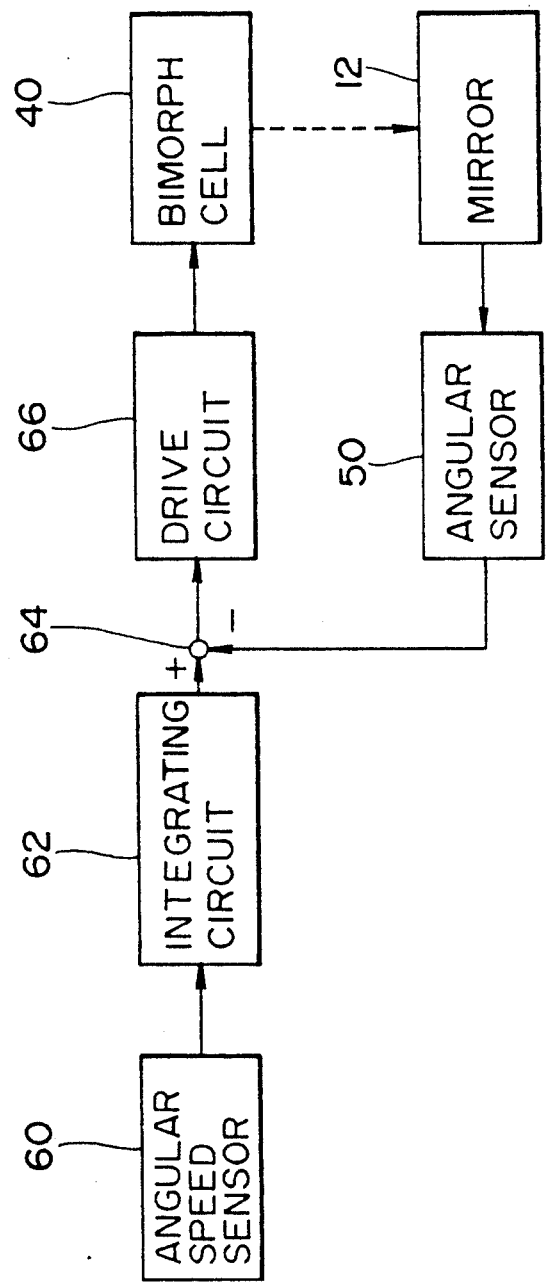
FIG. 4 is a block diagram of an example of a control system of a camera shake correction system according to the invention.

In FIG. 4, there is shown a block diagram of the control system of one bimorph 40 and, in this block diagram, an angular speed sensor 60 is used to detect the angular speed of the camera in the panning direction (X direction) or tilting direction (Y direction) thereof. The detection output of the angular speed sensor 60 indicating the angular speed of the camera is applied to an integrating circuit 62, where it is time integrated. By means of this, the shake angle of the camera can be detected.

The integrating circuit 60 outputs an instruction signal to a point of addition 64 as the control target value of the mirror 12, which instruction signal is used to cancel the shaking of the images caused by the above-mentioned, detected camera shake angle, that is, to indicate a half angle of the camera shake angle in an opposite direction to the shake direction of the camera.

Also, to the other input cf the point of addition 64, there is applied from the above-mentioned angular sensor 50 a signal which indicates the current inclination of the mirror 12, as a feedback value. Accordingly, the point of addition 64 outputs to a drive circuit 66 a signal which indicates a deviation between these two input signals. In order to make the deviation 0, the drive circuit 66 converts an input signal from the point of addition 64 into a suitable voltage signal and then applies the thus converted voltage signal to the bimorph 40.

The bimorph 40 is shifted according to the voltage signal input to thereby incline the mirror 12 through the drive pin 42.

As mentioned above, the inclination of the mirror 12 is controlled according to the shake of the camera, so that the shaking of the images can be corrected.

It should be noted here that the bimorph controlling method is not always limited to the above-mentioned embodiment but other methods can be employed, for example, a method requiring no positional feedback, a method which detects a camera shake component from a video image instead of an angular speed sensor, and the like.

Also, in the present embodiment, a clearance between the chassis and the mirror is varied by the bimorph in order to incline the mirror. However, the invention is not limited to this, but a voice coil or the like may be used. That is, any actuator will do, provided that it is able to change a clearance between the chassis and the mirror.

Next, description will be given below cf a second embodiment of a camera shake correction system according to the invention.

Figure 5:
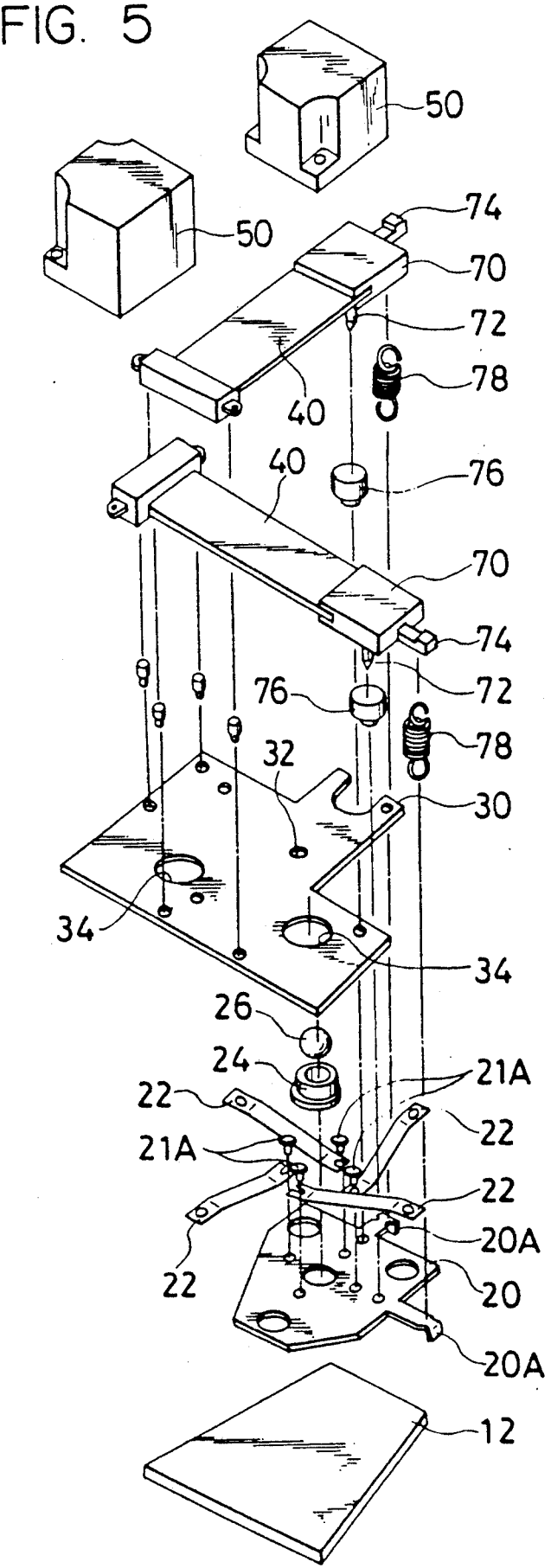
FIGS. 5 and 6 are, respectively, an exploded perspective view and a section view of a second embodiment of a camera shake correction system according to the invention.
Figure 6:
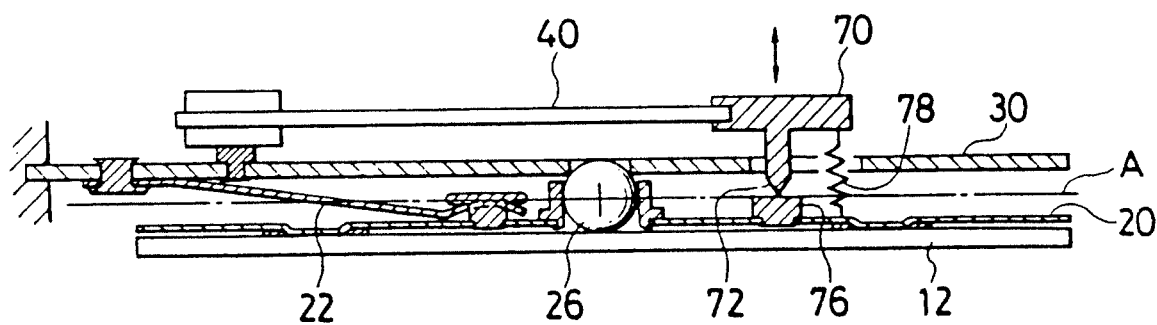

In FIGS. 5 and 6, there are shown an exploded perspective view and a section view of the second embodiment according to the invention, in which parts in common with FIG. 1 are given the same designations and the detailed description thereof is omitted here.

As can be understood from these figures as well, the second embodiment is different from the first embodiment in the power transmission means which is used to transmit driving forces bimorphs 40, 40 to the mirror 12 (mirror base plate 20).

In other words, as shown in FIG. 5, to the ore-side ends of the bimorphs 40, 40 are integrally coupled drive members 70, 70, respectively. The drive members 70, 70 has, on the mirror side surfaces thereof, drive pins 72, 72 respectively having conical tip ends as well as spring engagement portions 74, 74.

Also, to the positions of the mirror base plate 20 that are opposed to the above-mentioned drive pins 72, 72, there are fixed abutment members 76, 76 respectively. Also, there are provided spring engagement portions 20A, 20A in the mirror base plate 20.

And, in order that the drive pins 72, 72 can be always in contact with the abutment members 76, 76, respectively, there are provided coil springs 78, 78 between the spring engagement portions 74, 74 of the drive members and the spring engagement portions 20A, 20A of the mirror base plate.

In this embodiment, as shown in FIG. 6, a surface A passing through the center of the ball 26 and parallel to the mirror 12 is coincident with the upper surface of the abutment surface 76.

Figure 7:
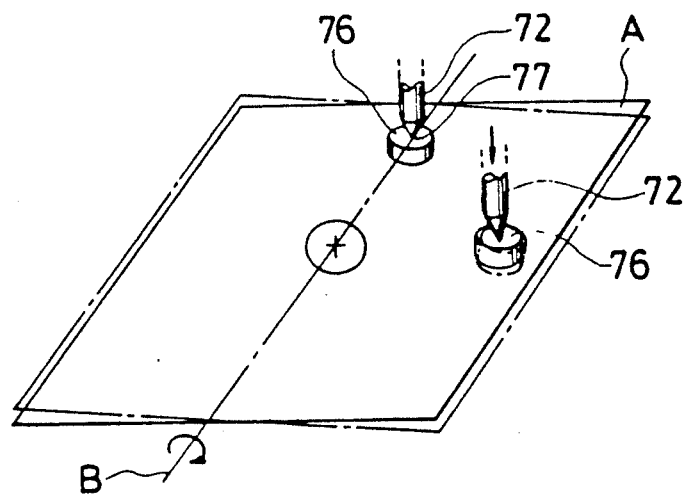
FIG. 7 is an explanatory view to explain that two drive pins used in the second embodiment do not interfere with each other.

Therefore, if a voltage is applied to the bimorph 40 and, as shown in FIG. 7, one of the drive pins 72 is shifted in a direction of an arrow, then the abutment member 76, mirror base plate 20 and mirror 12 are integrally rotated and oscillated around an axis of rotation B passing through the center of the ball 26. However, due to the fact that an engagement portion 77 at the leading end of the other drive pin 72 situated at a position perpendicular to the above drive pin 72 is on the surface A and thus on the axis of rotation B, the above-mentioned rotation and oscillation of the mirror will never give any external force to the engagement portion 77 and thus the engagement portion 77 will never be shifted at all.

In other words, the two drive pins respectively giving two perpendicular inclination shifts to the mirror are able to rotate and oscillate the mirror without interfering with each other.

Figure 8:
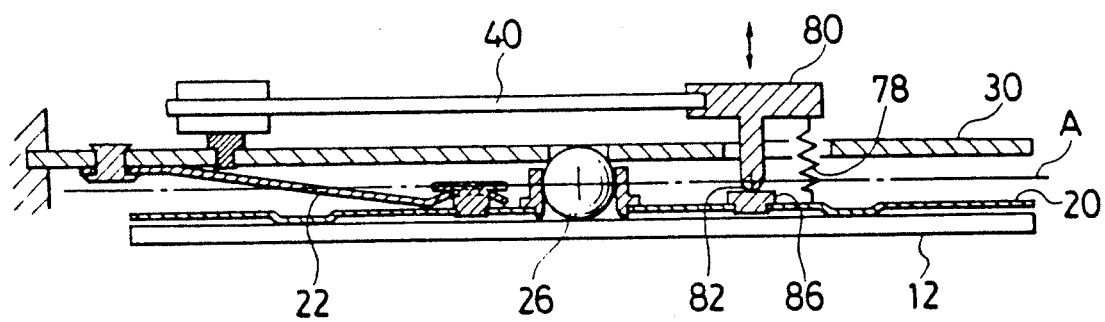
FIG. 8 is a section view of a third embodiment of a camera shake correction system according to the invention.

Referring now to FIG. 8, there is shown a section view of a third embodiment of a camera shake correction system according to the invention. In this embodiment, parts used in common with the second embodiment shown in FIG. 6 are given the same designations and the detailed description thereof is omitted here.

As can be clearly understood from FIG. 8, the drive member 80 and abutment member 86 of the third embodiment is different from the drive member 70 and abutment member 76 of the second embodiment.

In other words, the leading end of the drive pin 82 of the drive member 80 is formed in a hemi-spherical shape and the abutment member 86 is in contact with the spherical surface of the leading end of the drive pin 82. And, the radius of curvature of the hemi-spherical end of the drive pin 82 and the height of the abutment member 86 are decided in such a manner that the center of the hemi-spherical end portion of the drive pin 82 can be substantially identical with the surface A.

In this manner, according to the third embodiment, as in the second embodiment, the two drive pins can rotate and oscillate the mirror with no interference with each other.

Figure 10:
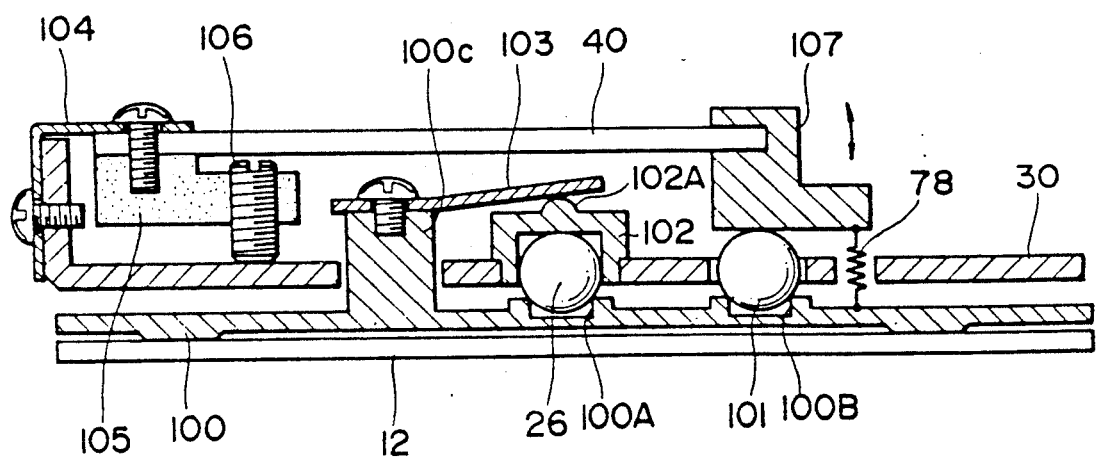
FIGS. 9 and 10 are, respectively, an exploded perspective view and a section view of a fourth embodiment of a camera shake correction system according to the invention.
Figure 9:
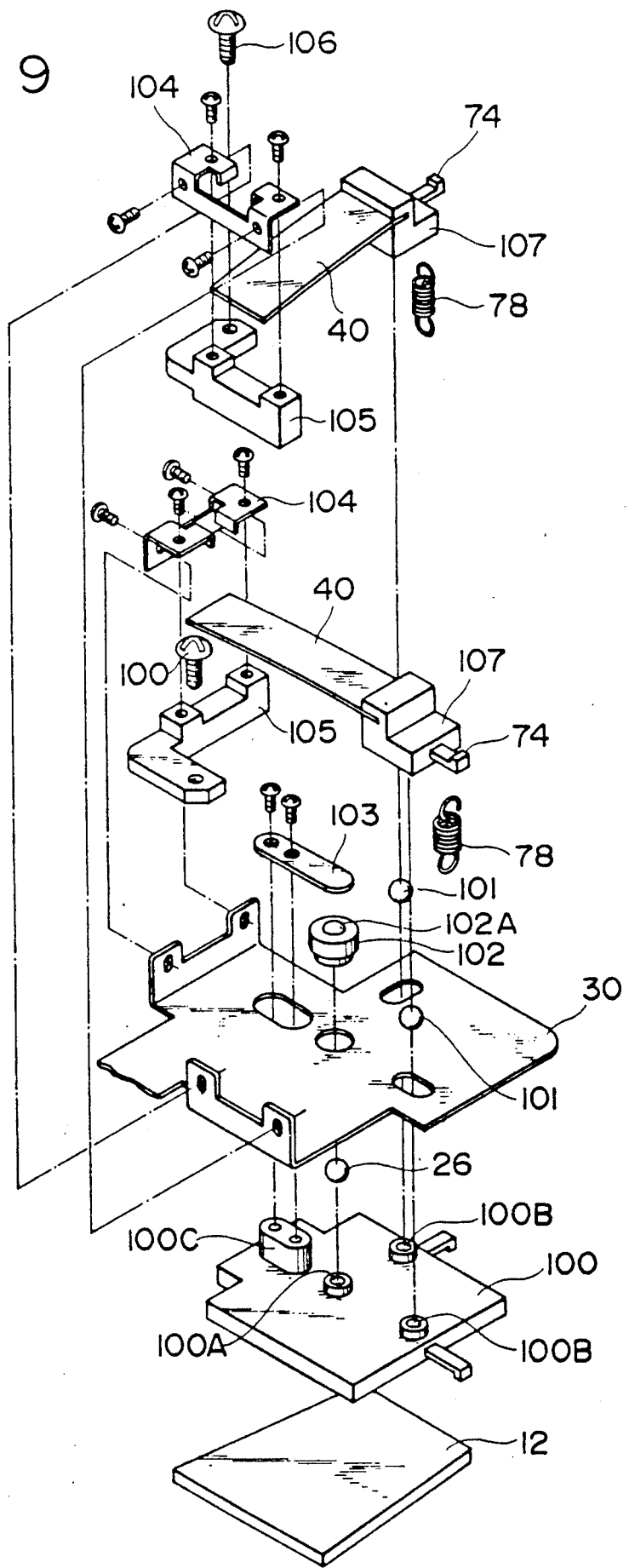

FIGS. 9 and 10 are respectively an exploded perspective view and a section view of a fourth embodiment of a camera shake correction system according to the invention, in which parts used in common with the first, second, and third embodiments are given the same designations and the detailed description thereof is omitted here.

As can be clearly understood from FIGS. 9 and 10, the fourth embodiment is different from the first to third embodiments manly in an energizing means for energizing the mirror toward the chassis 30 by a spring, a fixing means for fixing the bimorph 40 to the chassis 30, and a power transmission means for transmitting a driving force from the bimorph 40 to the mirror 12.

In other words, in a mirror base plate 100, there are provided three recessed portions 100A, 100B and 100B which can be fitted with a ball 26 for supporting the mirror 12 and two balls 101, 101 for driving the mirror 12, respectively, and a boss 100C. Also, a ball collar 102 is fixed to the chassis 30.

One end of plate spring 103 is fixed to the boss 100C of the mirror base plate 100 and the leading end of the plate spring 103 is in contact with a projected portion 102 provided in the ball collar 102. Due to this, the mirror base plate 100 can be pressed against the chassis by the plate spring 103 through the ball 26.

On the other hand, on the fixed end of the bimorph 40, a bimorph retaining member 104 having elasticity and a bimorph base 105 are provided. The bimorph retaining member 104 is fixed to the chassis 30 and energizes the bimorph 40 such that an adjustment screw 106 to be mounted to the bimorph base 104 can be brought into contact with the upper surface of the chassis 30.

Also, a drive member 107 is integrally coupled to the free end of the bimorph 40 and the ball 101 can be held between the lower surface of the drive member 107 and the recessed portion 100B of the mirror base plate 100. This embodiment is structured such that the center of the ball 101 (that is, a power transmission reference point) exists on a surface passing through the center of the ball 26 and parallel to the mirror 12.

As a result of this, similarly as in the second and third embodiments, two sets of power transmission means comprising the drive member 107 and ball 101 are able to transmit a rotational power to the mirror 12 without interfering with each other. Also, due to the fact that the center (that is, center of rotation) of the ball 26 is energized toward the chassis by the single plate spring 103, there is eliminated the possibility that the rotation of the mirror 12 is prevented by the energization of the plate spring 103.

Figure 11:
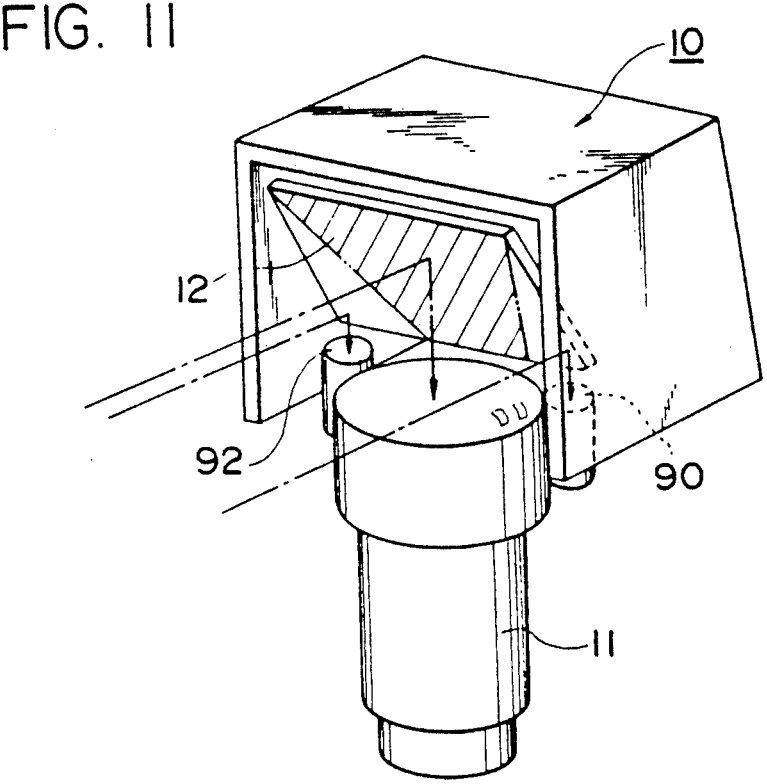
FIG. 11 is a general view of the whole structure of a fifth embodiment of a camera shake correction system according to the invention.

Referring now to FIG. 11, there is shown a general view of the whole structure of a fifth embodiment of a camera shake correction system according to the invention, in which parts used in common with FIG. 1 are given the same designations and the detailed description thereof is omitted here.

In FIG. 11, in the neighborhood of the taking lens 11, there are disposed two shake sensors 90, 90 such that are parallel to an optical axis, onto which sensors 90, 92 an object light reflected by the mirror is incident.

Figure 12:
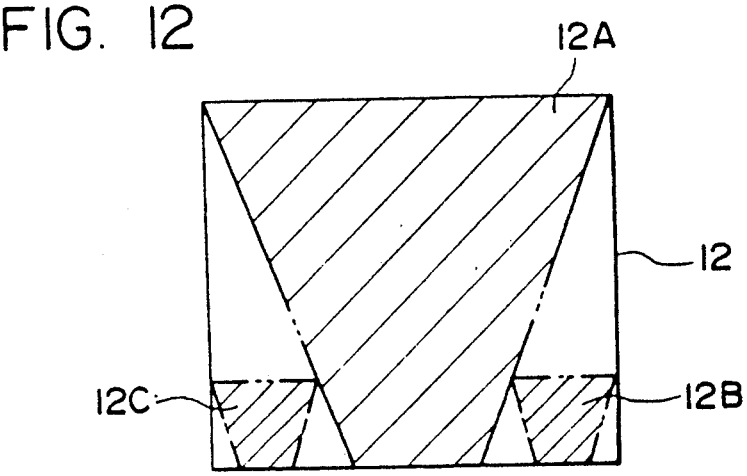
FIG. 12 is a view of the reflecting surfaces of a mirror, which is shown in FIG. 11, respectively for a taking lens and two shake sensors which are also shown in FIG. 11.

As shown in FIG. 12, the mirror 12 has a rectangular shape and includes in the central portion thereof a large trapezoidal reflection surface 12A for the taking lens. And, the mirror 12 and shake sensors 90, 92 are arranged such that two reflection surfaces 12B, 12C for the two shake sensors can be produced in two triangular shapes in the excess portion of the trapezoidal portion.

This allows the mirror 12 to be applied to the two shake sensors 90, 92 as well without increasing the size of the mirror 12 more than necessary.

Next, description will be given below of the structures of the above-mentioned sensors 90, 92 with reference to FIG. 13.

Figure 13:
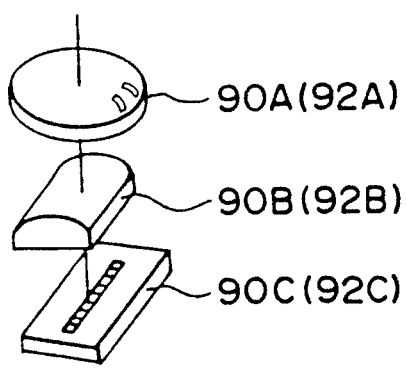
FIG. 13 is an exploded view of a shake sensor shown in FIG. 11.

As shown in FIG. 13, these shake sensors 90, 92 are composed of light receiving lenses 90A, 92A, cylindrical lenses 90B, 92B, and line sensors 90C, 92C, respectively. Here, the shake sensors 90 and 92 have the same structure: in the shake sensor 90, the line sensor 90C is arranged to be parallel to the right and left directions of the mirror 12 so as to able to detect the shake in the panning direction (X direction); and, in the shake sensor 92, the line sensor 92C is arranged to be parallel to the upward and downward directions of the mirror 12 so as to be able to detect the shake in the tilting direction (Y direction).

Figure 14:
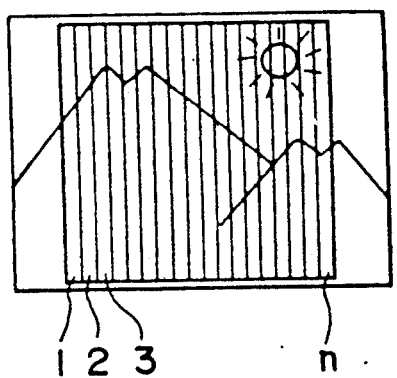
FIGS. 14 and 15 are respectively explanatory views to explain the line sensor outputs of two shake sensors shown in FIG. 11.
Figure 15:
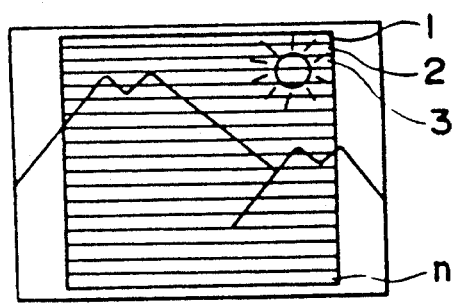

And, an object light incident on the shake sensor 90 is collected in the pixels 1−n of the line sensor 90C as a light corresponding to a range of 1−n as shown in FIG. 14 by the light receiving lens 90A and cylindrical lens 90B. Similarly, an object light incident on the shake sensor 92 is collected in the pixels 1−n of the line sensor 92C as a light corresponding to a range of 1−n as shown FIG. 15 by the light receiving lens 92A and cylindrical lens 92B.

Next, description will be given of a control system of the mirror using the above-mentioned shake sensors. The X- and Y-direction controls are performed similarly and thus only the X-direction control is explained here.

Figure 16:
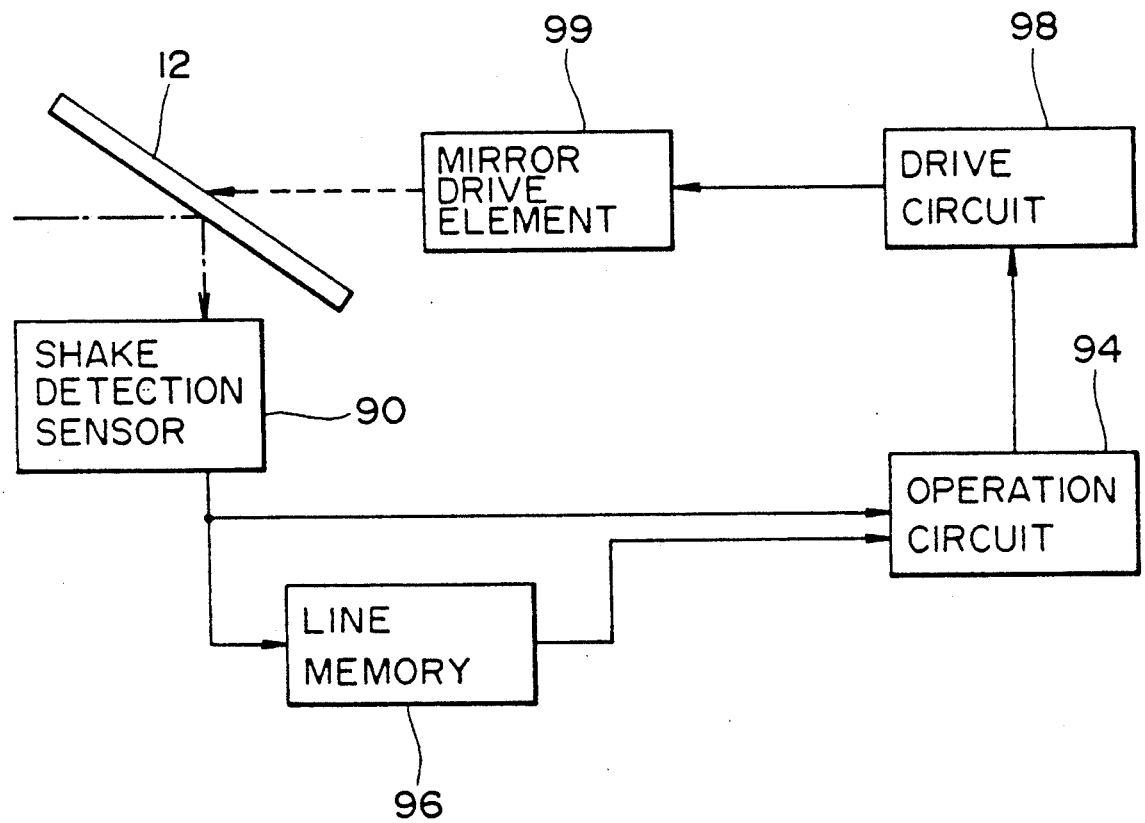
FIG. 16 is a block diagram of a control system of a fifth embodiment of a camera shake correction system according to the invention.

In FIG. 16, the object light reflected by the mirror 12 is allowed to enter the shake sensor 90 and is then converted in a photo-electric manner by the line sensor 90C of the shake sensor 90. The outputs of the line sensor 90C are sampled at predetermined time intervals, and some of the sampled outputs are input from the shake sensor 90 direct into an operation circuit 94 and the others are input into the operation circuit 94 after they are delayed by a predetermined time by a line memory 96.

The operation circuit 94 compares and operates these two inputs to thereby find the amount of movements of the object light formed on the line sensor 90C (the amount of movements corresponds to the X-direction shake of the camera). And, the operation circuit 94 outputs through a drive circuit 98 to a mirror drive element 99 a mirror control signal which makes the thus found amount of movements of the object light to zero.

The mirror drive element 99 is shifted according to the above-mentioned mirror control signal to incline the mirror 12. This can correct the shaking or oscillation of the image in the X direction caused by the camera shake.

In the fifth embodiment, the shakings of the image in the X and Y directions are to be corrected. However, the present invention is not always limited to this, but other structures are also possible; for example, the shaking of the image only in one of the X and Y directions can be corrected.

Next, description will be given below of a sixth embodiment of a camera shake correction system according to the invention, especially of a preferred embodiment of a shake sensor according to the invention.

Figure 17:
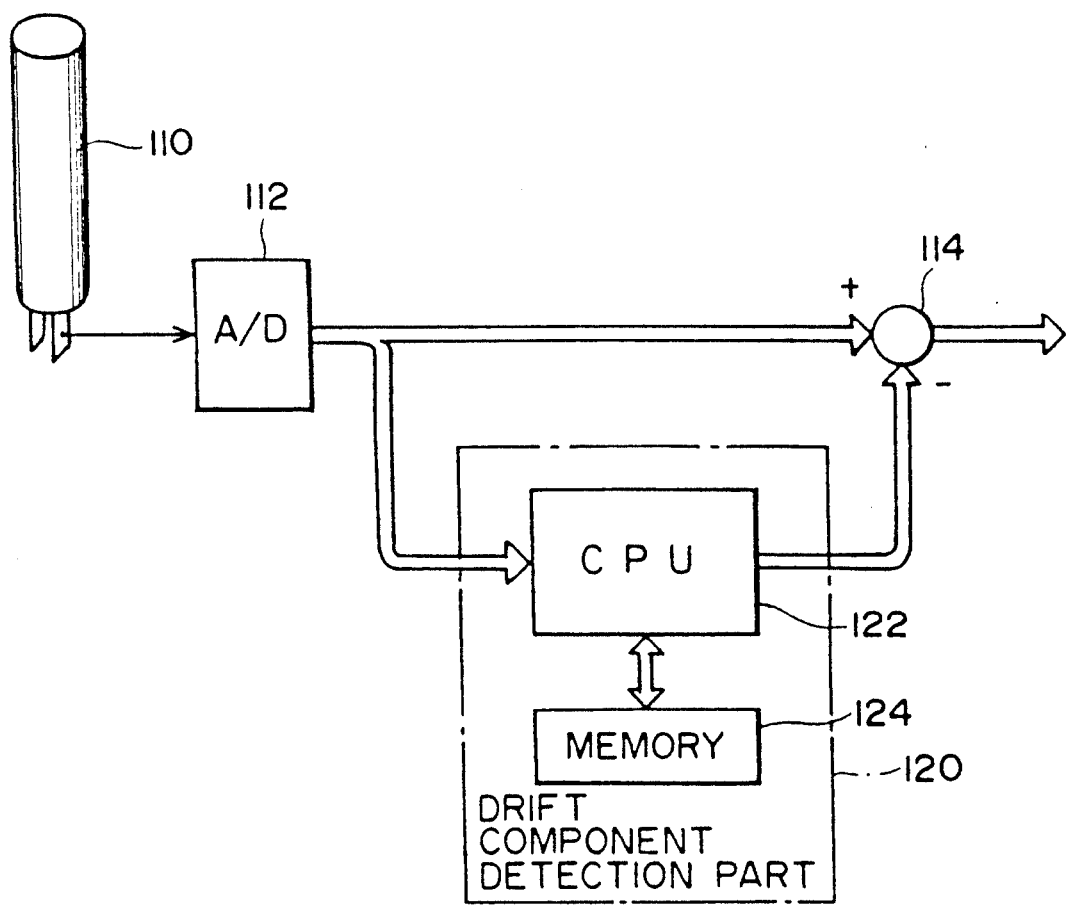
FIG. 17 is a block diagram of main portions of a sixth embodiment of a camera shake correction system according to the invention.

As shown in FIG. 17, the present shake sensor is mainly composed of an angular speed sensor 110 is, a drift component detect part 120, and a subtracter 114.

The angular speed sensor 110 is, for example, an angular speed sensor of a tuning fork type which detects the torsion of a tuning fork caused by a Coriolis force corresponding to angular speeds and outputs to an A/D converter 112 a voltage signal substantially proportional to the torsion (angular speed). In this voltage signal output from the angular speed sensor 110, there is included a drift voltage.

The A/D converter 112 converts the thus input voltage signal into a digital signal at a predetermined sampling cycle (for example, 10 ms) and then outputs the digital signal (A/D converted value) to the subtracter 114 and drift component detect part 120.

The drift component detect part 120 is composed of a central processing unit (CPU) 122 and a memory 124. The drift component detect part 120 calculates the average value of A/D converted values sampled before a predetermined time from the current time, that is, before a predetermined time (for example 10 sec.) shorter than the cycle of the drift component and longer than the cycle of the angular speed to be detected, and outputs the average value to the subtracter 114 as a value indicating the drift component, that is, as a value when the angular speed is zero.

The subtracter 114 subtracts the average value input from the drift component detect part 120 from the A/D converted value input from the A/D converter 112, and outputs the subtracted value as a signal indicating the angular speed. This can remove the drift component included in the output of the angular sensor 110.

Next, description will be given below in detail of the above-mentioned drift component detect part and the like with reference to a flow chart shown in FIG. 18.

Figure 18:
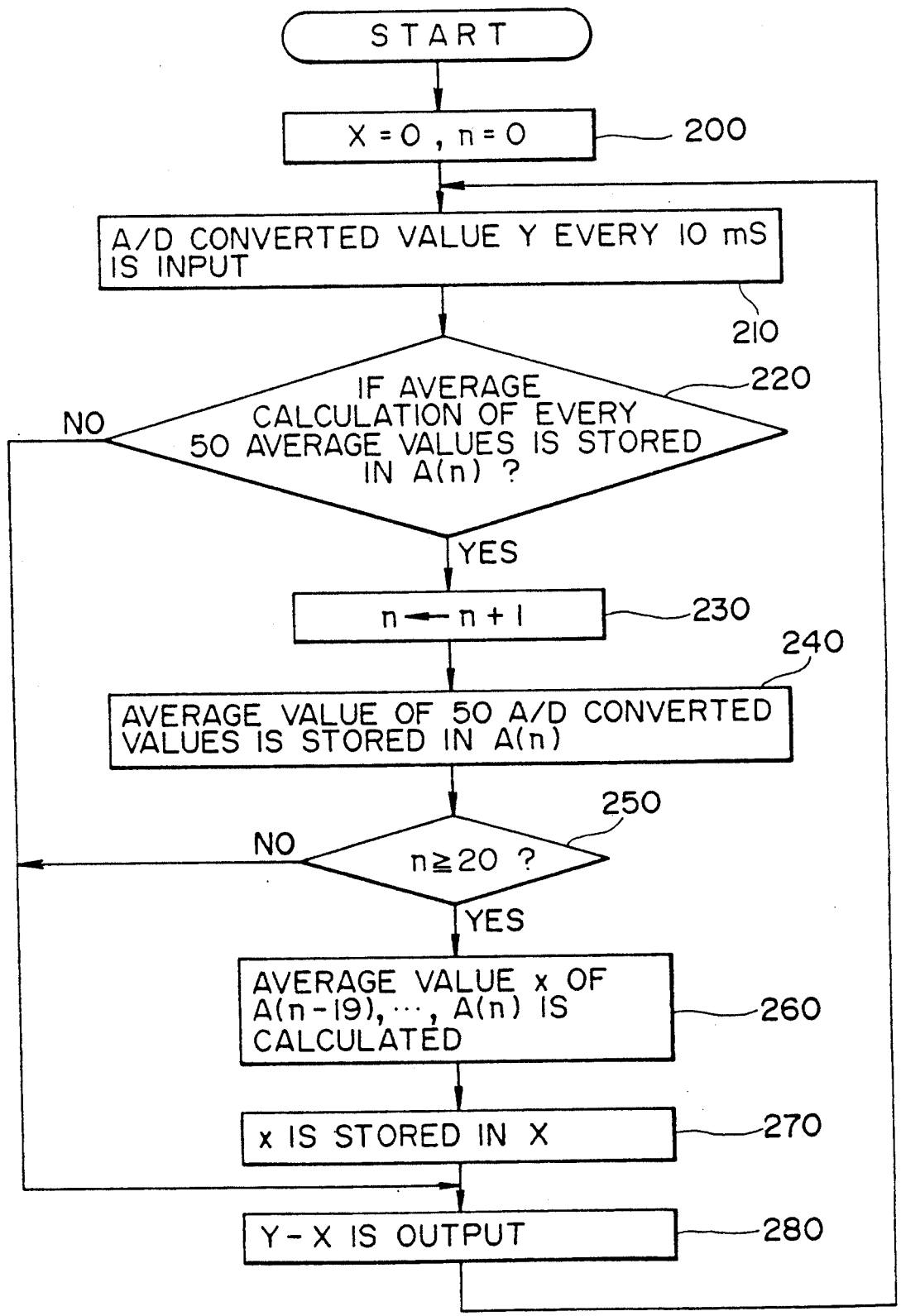
FIG. 18 is a flow chart used to explain the detailed operation of a shake sensor shown in FIG. 17.

As shown in FIG. 18, if the shake sensor is initiated, then X=0, n=0 are initially set (Step 200) and, after then, A/D converted values Y are input every 10 ms (Step 210).

And, 50 A/D converted value's are input and it is checked whether the average value of the 50 A/D converted values is calculated or not (Step 220). If the average value calculation is found not completed, then the program goes to Step 280, in which Step X is subtracted from the A/D converted value Y, the resultant value is output, and then the program goes back to 210. On the other hand, if the average value calculation is found completed, then the program goes to Step 230, in which n is incremented only by 1 and, after then, the average value of the 50 A/D converted values is stored in A(n) (Step 240).

Next, it is checked whether n is equal to or more than 20 or not (Step 250) and, if n is less than 20, then the program goes back through the above-mentioned Step 280 to Step 210.

On the other hand, if n is equal to or more than 20, then the average value x of 20 A/D converted values, that is, A (n−19), A (n−18, . . . , A (n−1), A (n) is calculated (Step 260), and, after the average value x is stored in X (270), Step 280 is executed.

In other words, after the program is started, the average value of 50 A/D converted values is calculated every 0.5 sec. (10 ms×50) and, when 10 sec. (0.5 sec.×20) have passed, then n=20 so that the average value x is calculated. Therefore, just before 10 sec. from the start of the program, the value of X in Step 280 is the initially set 0 and at just 10 sec. the average value x of 1000(50×20) A/D converted values is first calculated, and the average value x is substituted for the value of X.

After then, the average value of 50 A/D converted values is calculated every 0.5 sec. With this calculation, new average values x are calculated to update the values of X successively.

By updating the values of X (drift component values) in this manner, the drift component value can be gradually updated and also the memory capacity can be reduced.

In other words, by using the above-constructed shake sensor as means for detecting the camera shake of the camera shake correction system, the drift component included in the output of the angular speed sensor using a Coriolis force can be removed.

Figure 19:
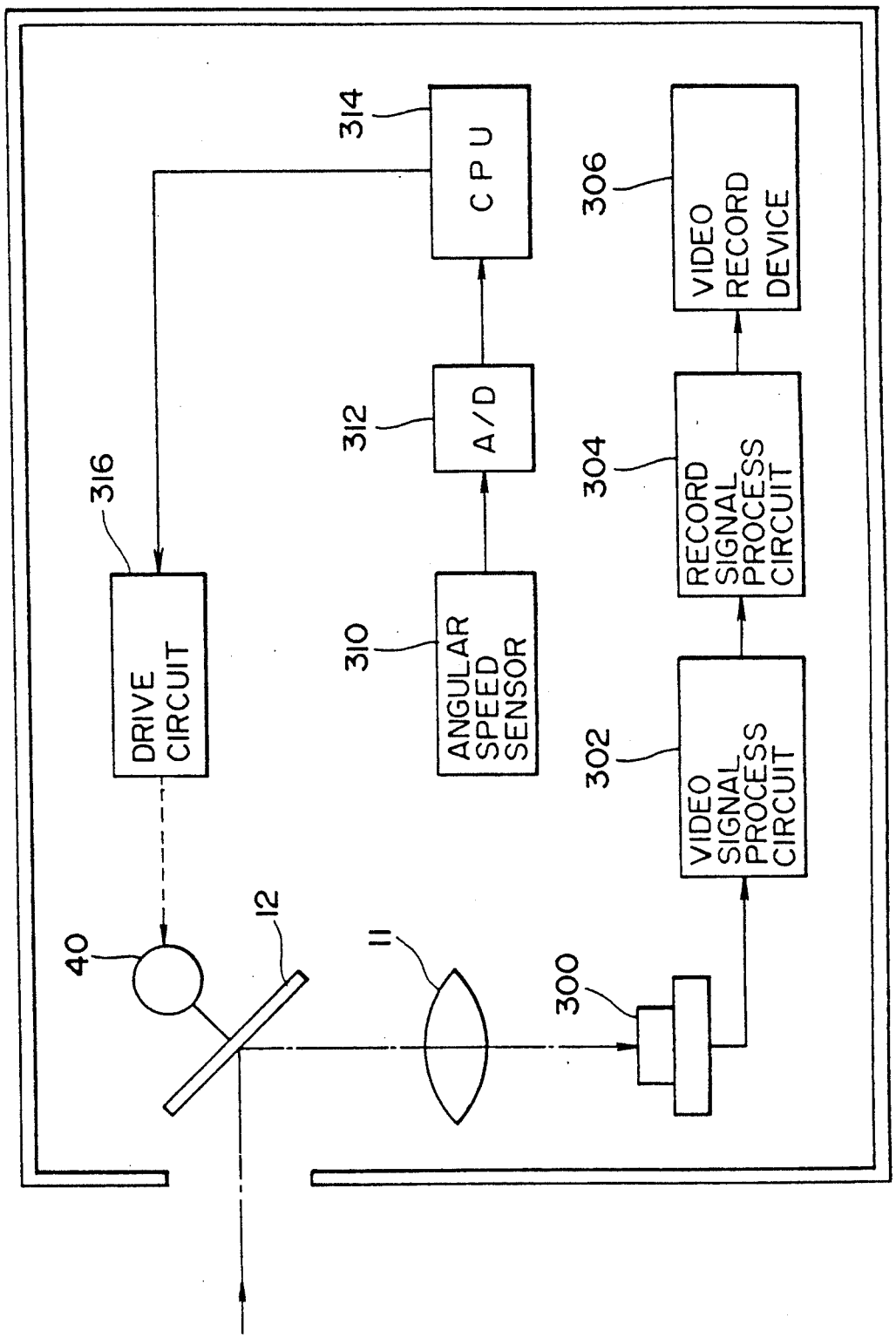
FIG. 19 is a block diagram of a seventh embodiment of a camera shake correction system according to the invention.

Now, referring to FIG. 19, there is shown a block diagram of a seventh embodiment of a camera shake correction system according to the invention, illustrating the whole structure of a video camera. In this figure, parts used in common with FIG. 1 are given the same designations and the detailed description thereof is omitted here.

As shown in FIG. 19, an object light enters an image pickup element (CCD) through the mirror 12 for camera shake correction and the taking lens 11 and is converted at the respective sensors of the CCD into signal charges corresponding to the magnitudes of the light. The thus converted signal charges are read out sequentially and are output to a video signal process circuit 302 sequentially.

The video signal process circuit 302 includes a white balance circuit, a $\gamma$ correction circuit, a matrix circuit, an encoder circuit and the like. The video signal process circuit 302 performs a predetermined signal processing by use of these circuits and, after then, outputs a video signal to a record signal process circuit 304.

The record signal process circuit 304 converts the thus input video signal into a record signal suitable for magnetic recording, and outputs the record signal to a video recording device 306. The video recording device 306 magnetically records the record signal input onto a video tape by means of a magnetic head.

The present video camera shake correction system is mainly composed of the mirror 12, a piezo-electric element (bimorphs) 40, an angular speed sensor 310, an A/D converter 312, a central processing unit (CPU) 314, and a drive circuit 316.

In this embodiment, the mirror 12, a bimorph 40 and the like are constructed in a similar manner to those in FIG. 3, and the like and, therefore, the detailed description is omitted here.

Next, description will be given below of a control system of the above-mentioned bimorph 40.

The angular speed sensor 310 is, for example, an angular speed sensor of a tuning fork type, which detects the torsion of a tuning fork caused by a Coriolis force corresponding to the angular speeds of the video camera and outputs to an A/D converter 312 a voltage signal proportional to the angular speeds of the video camera.

The A/D converter 312, as shown in FIG. 20(A), converts the voltage signal input at a given cycle (for example, at a cycle of 10 ms) into a digital signal and outputs the digital signal (A/D converted value) to a CPU 314.

Figure 21:
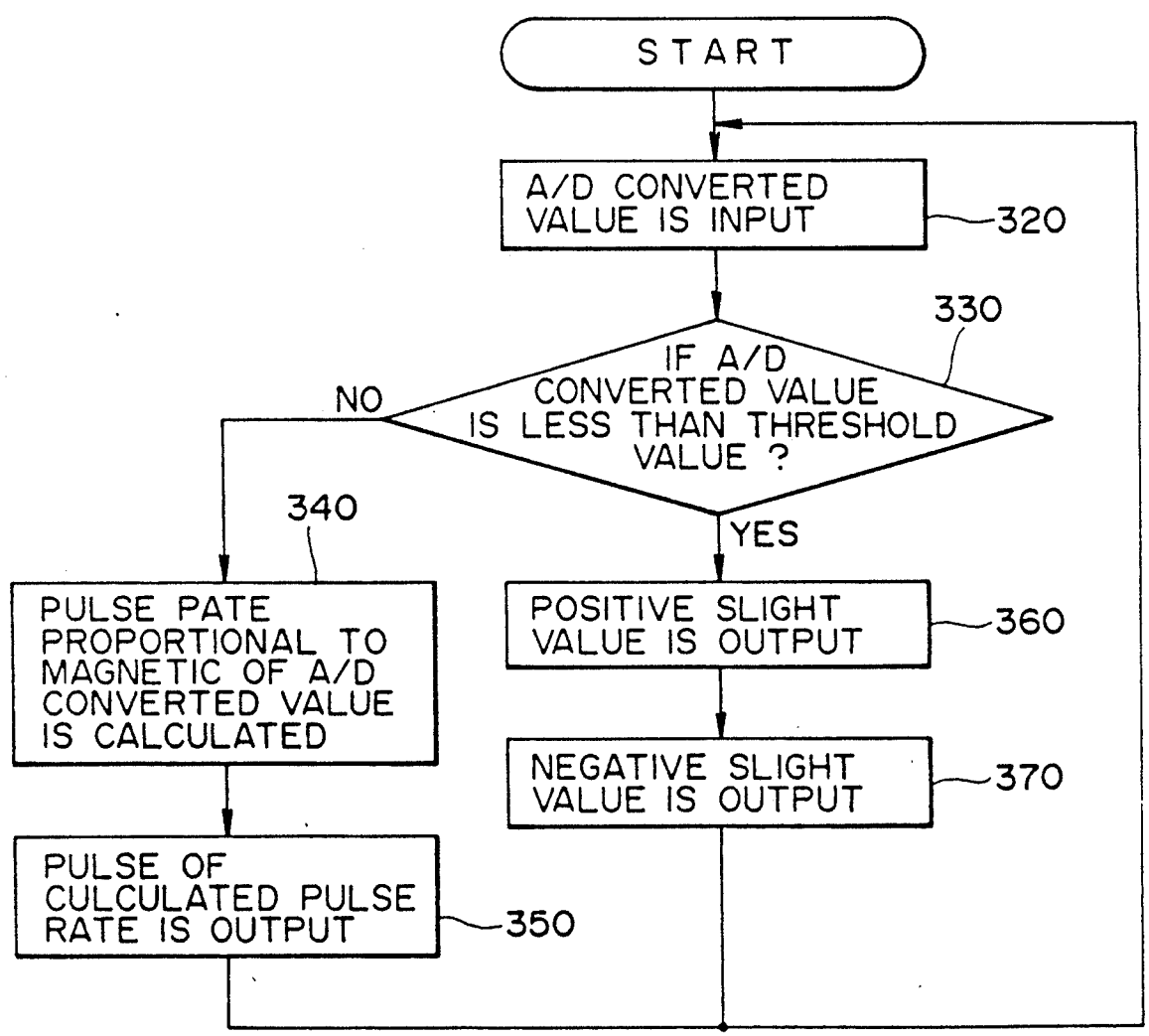
FIG. 21 is a flow chart used to explain the operation of the CPU shown in FIG. 19.

The CPU 314 is operated in such a manner as illustrated in a flow chart in FIG. 21. That is, when the A/D converted value is input (Step 320), the CPU 314 decides whether the thus input A/D converted value is less than a predetermined threshold value (a value which indicates a level requiring no camera shake correction) or not (Step 330). If the input A/D converted value is equal to or more than the predetermined value, then the processings for correction of camera shake are to be executed (Steps 340, 350).

Figure 20:
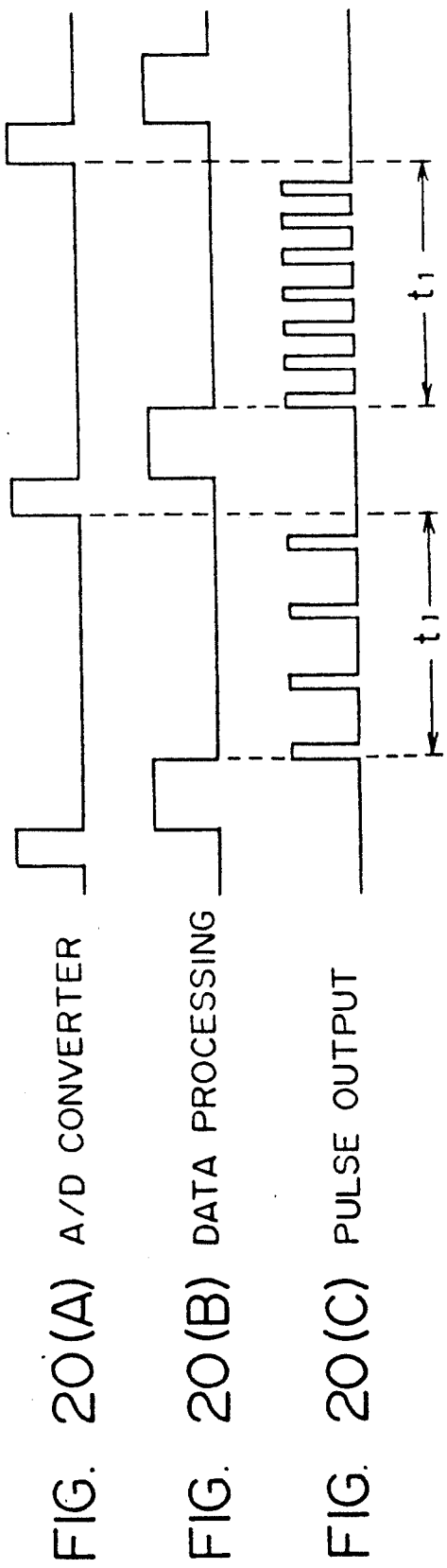
FIG. 20A, B and C is a timing chart used to explain the operations of an A/D converter and CPU shown in FIG. 19.

In other words, in Step 340, a predetermined data processing is executed which, in accordance with the A/D converted value input, calculates pulse rates proportional to the magnitude of the thus input A/D converted value (namely, angular speed) (FIG. 20 (B)), and in Step 350, after the calculation of the pulse rate, during a predetermined time $t_1$ until calculation of the next pulse rate, a pulse signal is output to the drive circuit 316 (see FIG. 20(C)).

As a result of this, during the predetermined time $t_1$, a number of pulses, the number being proportional to the angular speeds, are applied to the drive circuit 316.

On the other hand, if the A/D converted value is found less than a predetermined threshold value in Step 330, then a positive slight value (for example, a pulse signal having 1 pulse or several pulses) is output to the drive circuit 316 (Step 360) and, after then, a negative slight value is output to the drive circuit 316 (Step 370).

As a result of this, the positive and negative pulse signals are applied to the drive circuit 316 alternately.

Then, the drive circuit 316 amplifies the pulse signal input thereto and injects electric charges into the bimorph 40. That is, if the A/D converted value is equal to or more than the predetermined value, then the drive circuit 316 injects electric charges having a constant magnitude at an interval corresponding to the pulse rate of the pulse signal input from CPU 314.

As a result of this, the amount of electric charges, which is proportional to the angular speed, is injected into the bimorph 40 and the bimorph 40 is shifted in proportion to the amount of electric charges injected to thereby incline the mirror 12. Also, if the sign of the angular speed is inverted, then the polarity of the pulse signal output from the CPU 314 is also inverted to thereby shift the bimorph 40 in the opposite direction. The above-mentioned operations are executed repeatedly at a short cycle and, therefore, the mirror 12 is successively inclined at the angular speeds proportional to the angular speeds of the video camera to thereby stabilize the object light incident on the taking lens 11.

On the other hand, if the A/D converted value is less than the predetermined value, then the drive circuit 316 amplifies the positive and negative pulse signals input from the CPU 314 and injects the slight electric charges alternately into the bimorph 40.

As a result of this, the bimorph 40 repeats slight oscillations within a range of mechanical play between the mirror 12 and the bimorph 40 or slight oscillations in which the oscillations of the mirror 12 are negligible. For this reason, for example, even when the bimorph 40 is situated adjacent to the terminal end of the operating range thereof, if the camera remains still during a predetermined time, then the bimorph 40 repeats slight oscillations and goes back to the center of the operating range thereof.

Now, in order to correct the shaking of the image caused by the video camera shake, the mirror 12 must be inclined in the opposite direction at a half angular speed of the angular speed of the video camera. And, in order to drive the mirror 12 in this manner by use of an open loop, it is necessary to previously control the magnitude of the amount of the electric charges injected into the bimorph 40. This control of the amount of the electric charges to be injected can be performed, for example, by shaking the video camera forcibly and at the same time by controlling the gain of the drive circuit 316 so that the shaking of the image can be minimized or by controlling the sensitivity of the angular speed sensor 316.

Also, according to the present embodiment, by injecting the pulse electric charges having the pulse rate proportional to the angular speeds of the video camera, the amount of the electric charges injected per unit time is controlled. However, the present invention is not always limited to this, but, the amount of the electric charges injected per unit time can be controlled in other ways, for example, by controlling a pulse width or a pulse amplitude proportional to the angular speed of the video camera.

Further, according to the present embodiment, description has been given of the camera shake correction in either of the yawing (X) and pitching (Y) directions of the video camera, but, in general, the same two correction systems exist.

Still further, the present invention is not limited to the camera shake correction system that drives the mirror by use of the piezo-electric element, but other systems are also possible. For example, the taking lens may be driven by use of the piezo-electric element. That is, any camera shake correction systems will do, provided that the optical member of the photographing optical system is driven by the piezo-electric element to correct the camera shake.

Figure 22:
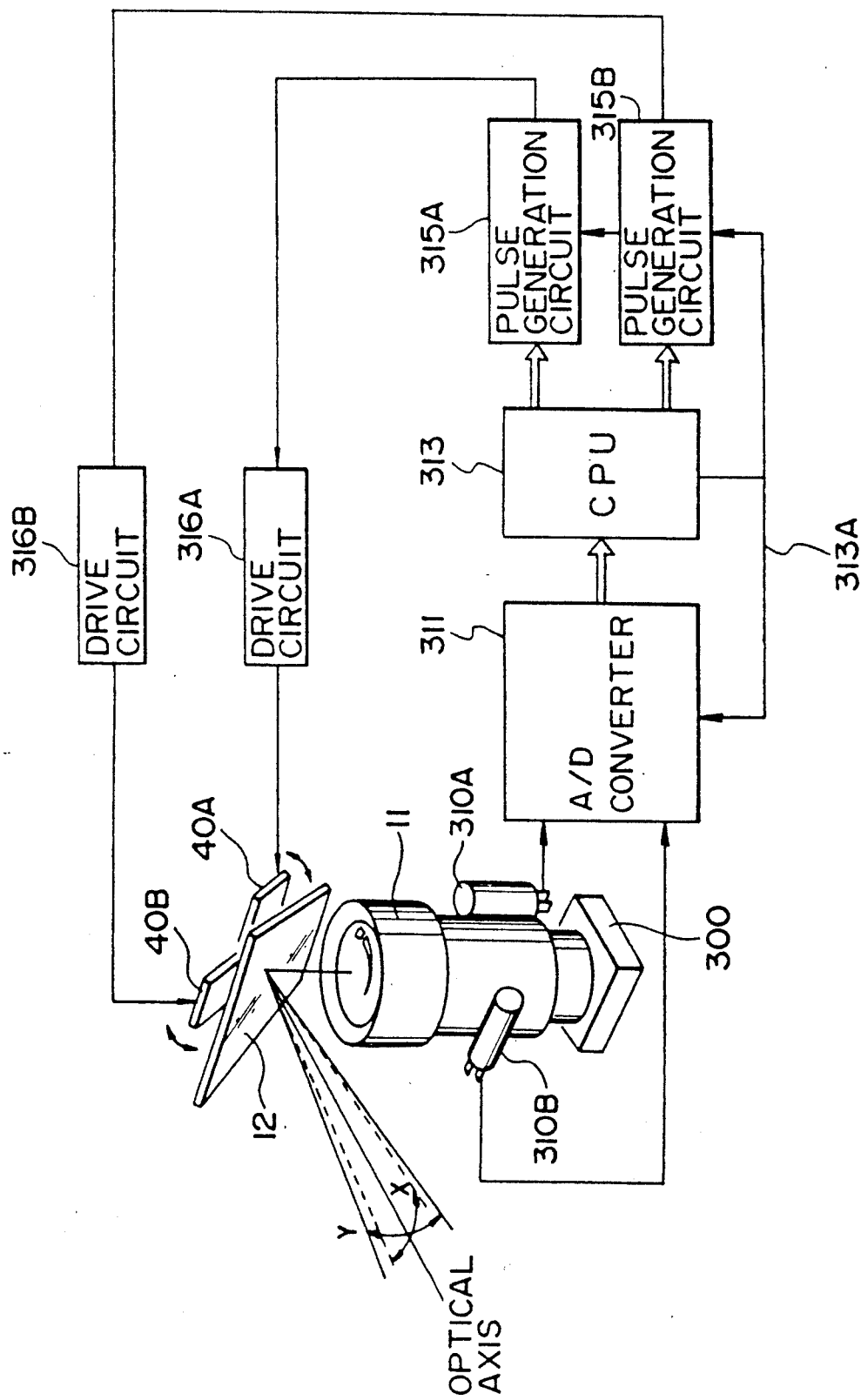
FIG. 22 is a block diagram of a eighth embodiment of a camera shake correction system according to the invention.

Now, referring to FIG. 22, there is shown a block diagram of a eighth embodiment of a camera shake correction system according to the invention. The eighth embodiment is substantially similar in structure to the seventh embodiment shown in FIG. 19, but the former is different from the latter in that the main portions of two, namely, X- and Y-direction control systems are used in common.

In FIG. 22, a bimorph 40A is used to drive the mirror 12 in the X direction, while a bimorph 40B is used to drive the mirror 12 in the Y direction.

Next, description will be given below of the control systems of the above-mentioned two bimorphs 40A and 40B.

Each of angular speed sensors 310A and 310B is an angular speed sensor, for example, of a tuning fork type. The angular speed sensors detect the torsions of a tuning fork caused by a Coriolis force corresponding to the angular speeds in the yawing (X) and pitching (Y) directions of the video camera, and respectively output to an A/D converter 311 voltage signals proportional to the angular speeds in the X and Y directions of the video camera.

The A/D converter 311 is controlled by a control signal which is applied from a CPU 313 through a control bus 313A. The A/D converter 311, as shown in FIG. 23(A), converts the voltage signals in the X and Y directions input at a given cycle $t_1$ (for example, 10 ms) into digital signals alternately and outputs to the CPU 313 the digital signals corresponding to the accelerations in the X and Y directions, alternately.

The CPU 313, in accordance with the digital signal input thereto, executes a predetermined data processing to find a pulse rate proportional to the magnitude of the input digital signal (that is, angular speed) (FIG. 23(B)), and outputs data indicating the pulse rate to a pulse generator 315A or 315B.

In other words, when the digital signal in the X direction is input from the A/D converter 311, the CPU 313 outputs to the pulse generator circuit 315A data indicating a pulse rate proportional to the magnitude of the digital signal and, when the digital signal in the Y direction is input from the A/D converter 311, it outputs to the pulse generator circuit 315B data indicating a pulse rate proportional to the magnitude of the digital signal.

As mentioned above, the CPU 313 performs, in a time sharing manner at every given cycle, the control of A/D conversion of the voltage signal proportional to the X direction acceleration and the data processing in accordance with the A/D converted digital signal.

The pulse generator circuits 315A and 315B, each of which is composed of, for example, a preset counter, use as a preset value the data indicating the pulse rate applied from the above-mentioned CPU 313. When a count value reaches the preset value, then they output a pulse signal representing the completion of count and also reset the count value to "0". By repeating these operations, the pulse generator circuits 315A and 315B output to drive circuits 316A and 316B a pulse signal of a pulse rate corresponding to the data (that is, preset value) indicating the pulse rate.

Figure 23:
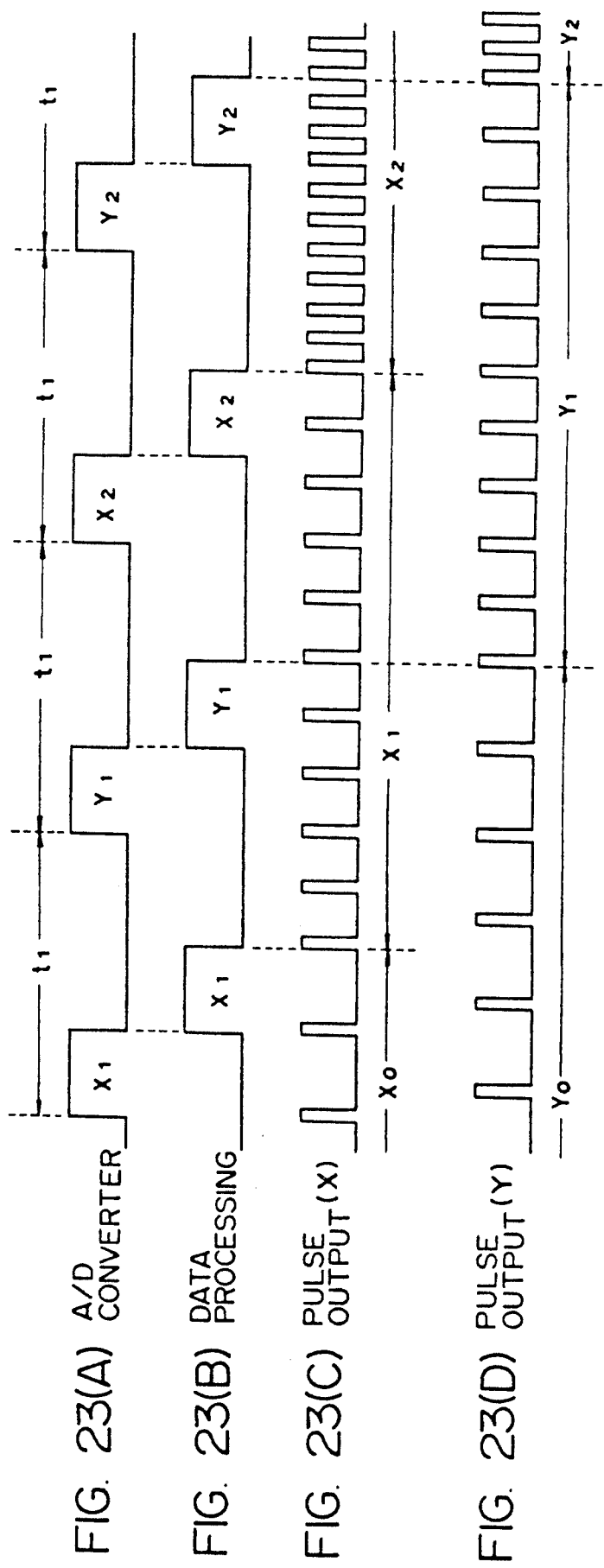
FIG. 23A, B, C and D is a timing chart used to explain the operations of an A/D converter, a CPU and a pulse generating circuit respectively shown in FIG. 22.

Accordingly, when the data indicating the pulse rate is input from the CPU 313, the pulse generator circuits 315A and 315B, until the data indicating the next pulse rate is input, count the input data as a preset value independent of the operation of the CPU 313 and continue to generate pulse signals of a pulse rate corresponding to the preset value (see FIGS. 23 (C), (D)).

The drive circuits 316A and 316B amplify pulse signals input from the pulse generator circuits 315A and 315B, and inject electric charges into bimorphs 40A and 40B. That is, the drive circuits 316A and 316B inject pulse electric charges having a constant magnitude at an interval corresponding to the pulse rate of the pulse signal input from the pulse generator circuits 315A and 315B.

In this manner, an amount of electric charges proportional to the angular speed is injected into the bimorphs 40A and 40B and the bimorphs 40A and 40B are shifted in proportion to the amount of electric charges injected to thereby incline the mirror 12. When the sign of the angular speed is inverted, the polarities of the pulse signals output from the pulse generator circuits 315A and 315B are inverted as well, whereby the bimorphs 40A and 40B are shifted in the opposite direction. Since the above operations are executed repeatedly at a short cycle of 2 $t_1$ and pulse electric charges having a constant pulse rate are injected within the cycle of 2 $t_1$, the mirror 12 is inclined successively in the X and Y directions at an angular speed proportional to the angular speeds in the X and Y directions of the video camera, so that the object light incident on the taking lens 11 can be stabilized.

In the present embodiment, the amount of electric charges to be injected per unit time can be controlled by injecting the pulse electric charges having a pulse rate proportional to the angular speed of the video camera. However, this is not limitative, but other controlling methods can be used. For example, the amount of electric charges to he injected per unit time can also be controlled by controlling the pulse width of a pulse signal having a constant pulse rate in proportion to the angular speed of a video camera. In this case, a pulse generator circuit is composed of two pulse generators, which generate a pulse signal having a constant cycle with a duty ratio of 50%, and an AND circuit which takes the AND conditions of pulse signals generated from these pulse generators. In the CPU 313, a phase difference proportional to an angular speed is calculated and the two pulse generators are operated so that a phase difference between two pulse signals respectively generated from the two pulse generators is equal to the calculated phase difference.

Next, description will be given below of an ninth embodiment of a camera shake correction system according to the invention.

Figure 24:
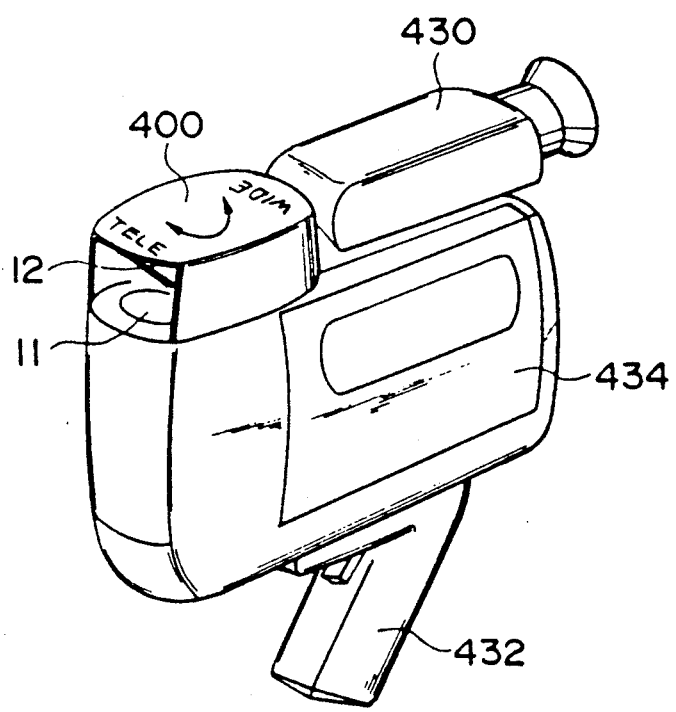
FIG. 24 is a perspective view of a video camera incorporating an ninth embodiment of a camera shake correction system according to the invention.

In FIG. 24, there is shown a perspective view of a video camera having a camera shake correction system. In this figure, parts used in common with FIG. 1 are given the same designations.

As shown in FIG. 24, the video camera includes on the upper surface of the main body thereof a switching unit 400 which is used to switch tele and wide sides to each other. Also, a taking lens 11 is stored in the front portion of the camera main body.

Figure 25:
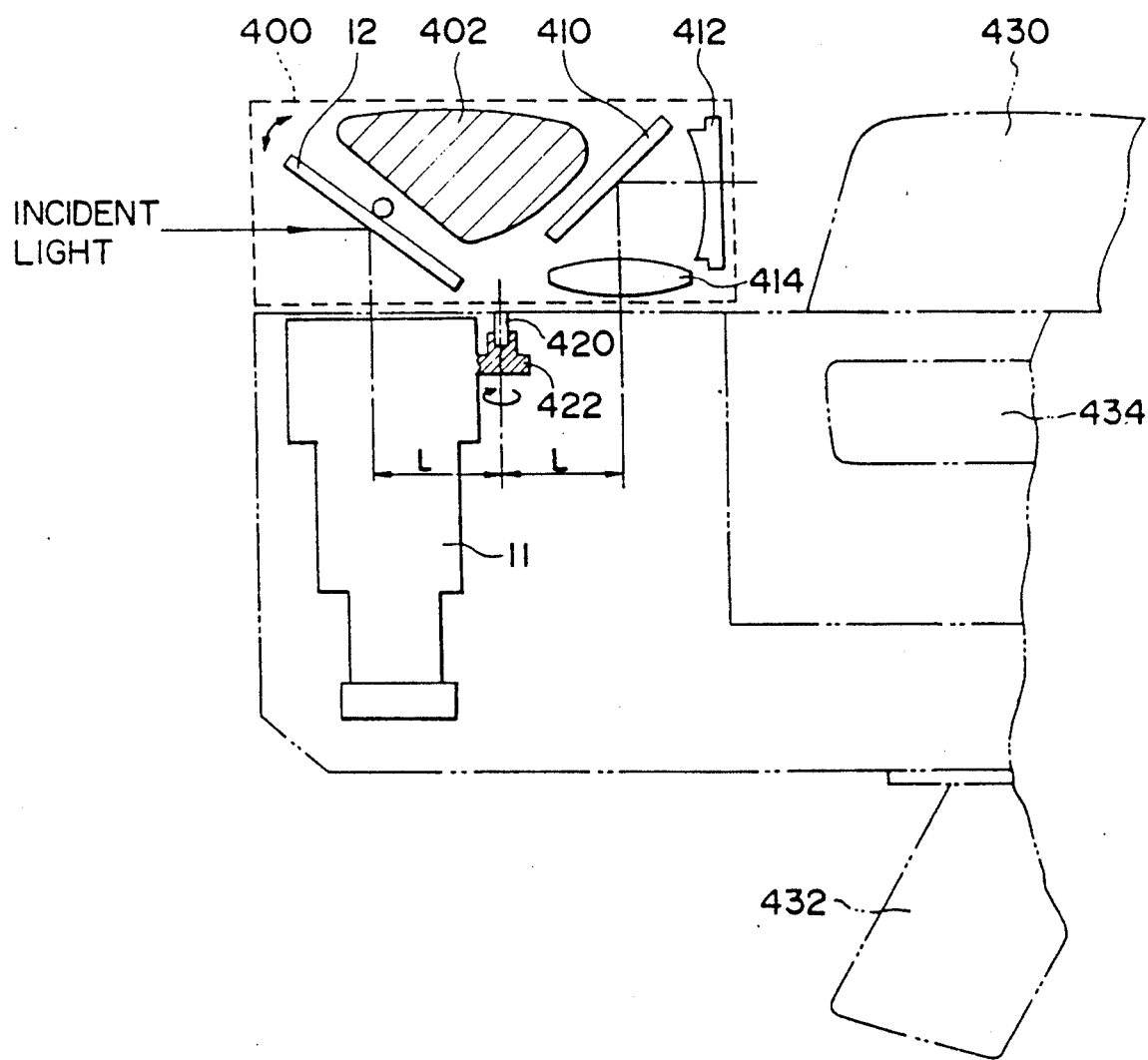
FIG. 25 is an enlarged view of main portions of the ninth embodiment shown in FIG. 24.

FIG. 25 is an enlarged view of main portions of the video camera shown in FIG. 24. As shown in FIG. 25, on the left of the switching unit 400 there is arranged a camera shake correction part, and a mirror 12 for camera shake correction is provided on the optical axis of the taking lens 11 at an angle of 45°. The mirror 12 is inclined by a control part 402 provided on the back surface side thereof so as to be able to correct the shake of the video camera, as described before.

On the other hand, on the right of the switching unit 400 there is arranged a wide converter part which is composed of a mirror 410, and lenses 412, 414.

In the center of the lower end portion of the switching unit 400 constructed in this manner, a shaft of rotation 420 is provided in such a manner that it projects downward. The shaft of rotation 420 is rotatably supported by a bearing portion 422 provided in the taking lens 11. In this structure, a distance (L) from the shaft of rotation 420 to the optical axis of the taking lens 11 is equal to a distance from the shaft of rotation 420 to the optical axis of the wide converter part. Therefore, if the switching unit 400 is rotated 180°, then the optical axis of the wide converter part is coincident with the optical axis of the taking lens 11.

In FIGS. 24 and 23, reference numeral 430 designates a view finder, 432 stands for a grip, and 434 designates a cassette storage portion.

Now, description will be given below of the operation of the video camera incorporating a camera shake correction system constructed in the above-mentioned manner according to the invention.

Firstly, when photographing on the tele side, the switching unit 400 is rotated as shown in FIGS. 24 and 25, and the mirror 12 is disposed above the optical axis of the taking lens 11. Therefore, the object light enters the taking lens 11 through the mirror 12. In this state, if the video camera is shaked, then the mirror 12 is inclined by a control part 402 correspondingly to the shake of the video camera to thereby correct the shaking of a picture image caused by the shake of the video camera.

Next, when photographing on the wide side, the switching unit 400 is rotated 180° from the above-mentioned state to coincide the optical axis of the wide converter part with the optical axis of the taking lens 11. This allows the object light to enter the taking lens 11 through the lens 412 for the wide converter, mirror 410 and lens 414.

As mentioned above, according to the present video camera, the object light enters the taking lens 11 through the camera shake correction mirror 12 in the tele-side photographing and through the mirror 410 within the wide converter part in the wide-side photographing, the images obtained when photographed on the tele side and on the wide side are not inverted from each other. Also, because the control part 402 comprising a mirror drive mechanism, a control circuit for the mirror drive mechanism and the like can be stored in space produced between the camera shake correction mirror 12 and the back surface of the mirror 410 within the wide converter part, a higher space efficiency can be obtained. Further, since the wide converter part can be made compact by providing the mirror 410, the switching until 400 can be made compact.

In the above-mentioned embodiment, the switching unit 400 is rotatably arranged above the taking lens 11. However, this in not limitative, but a switching unit 450 may be arranged such that it can be slided right and left, as the tenth embodiment shown in FIG. 26.

Figure 26:
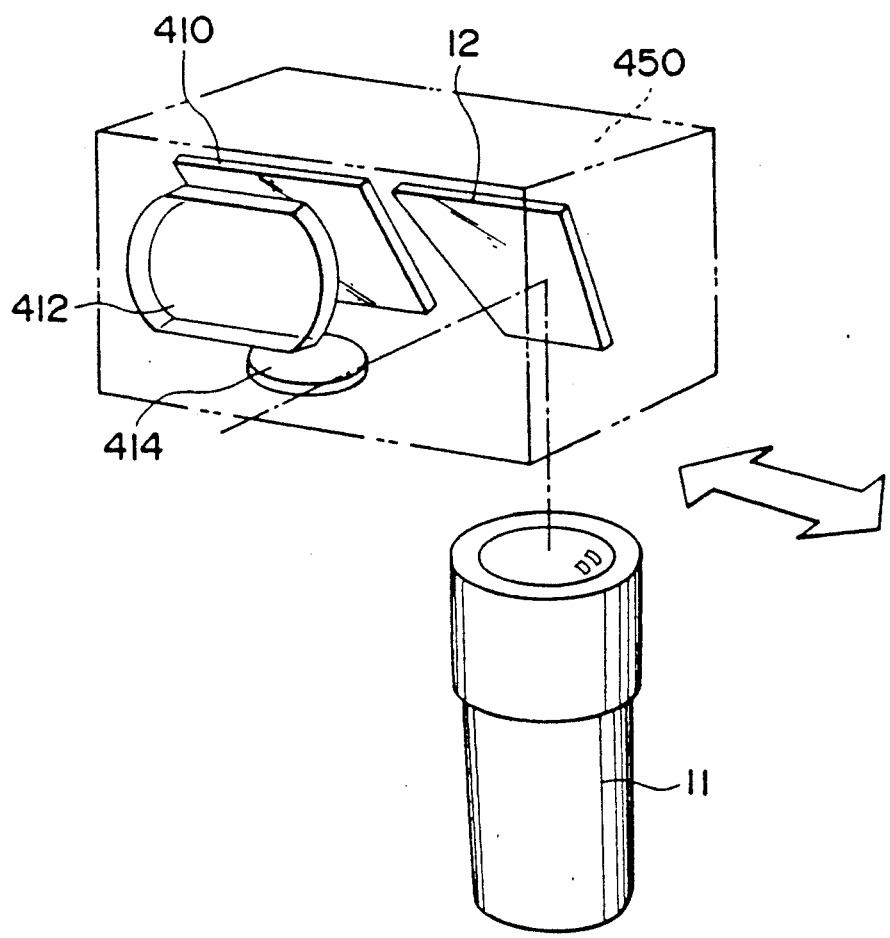
FIG. 26 is an enlarged view of main portions of a video camera incorporating a tenth embodiment of a camera shake correction system according to the invention; and, FIG. 27 is a block diagram of an example of a camera shake correction system according to the prior art.
Figure 27:
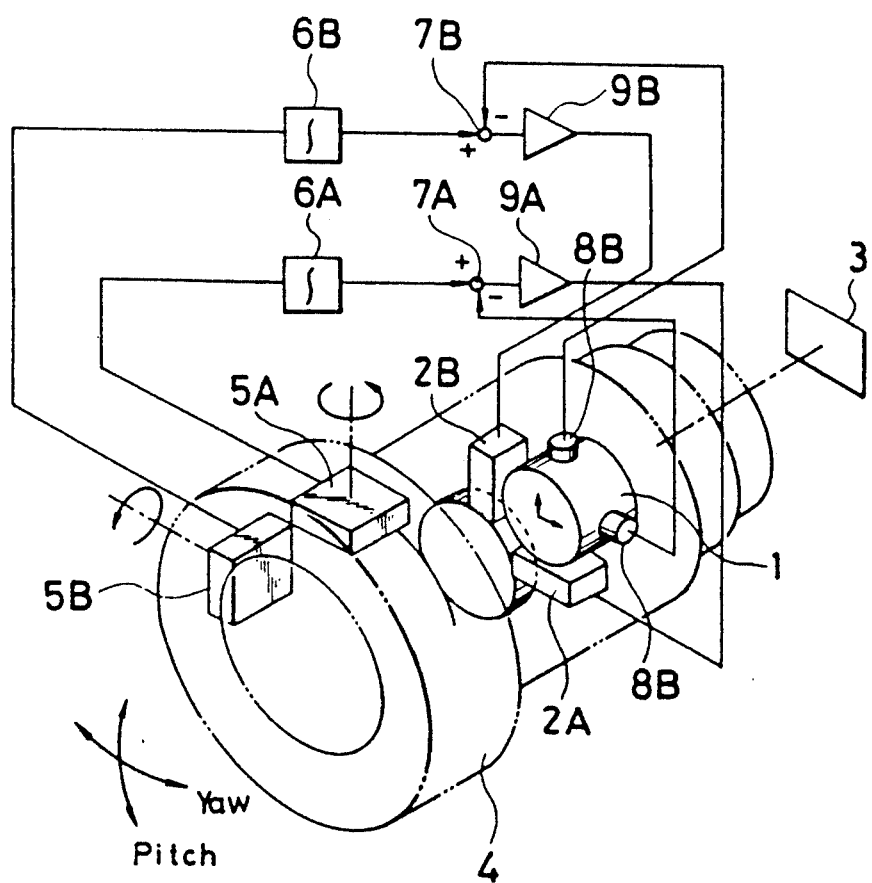

In other words, within the switching unit 450, there are provided the mirror 12 for camera shake correction and the mirror 410 within the mirror 410 in such a manner that they are parallel to each other and are inclined at an angle of 45°. Therefore, the tele side and wide side photographings can be switched to each other by moving the switching unit 450 in a direction of an arrow in FIG. 26. In FIG. 26, parts used in common with FIG. 25 are given the same designations.

As has been described heretofore, according to a camera shake correction system in accordance with the present invention, because the camera shake correction mirror is disposed so as to be situated in front of the taking lens, the taking lens can be designed without taking the mirror into consideration and also a currently existing taking lens can be used. Also, since the mirror support mechanism is simple in structure, the present system can be made compact and light, and can be reduced in costs. Further, due to employment of the structure which holds the ball therebetween to press the ball against the chassis, no play can be produced in the support portion and the mirror can be positioned with accuracy.

Also, according to the invention, due to the fact that a shake sensor less expensive than a conventional angular speed sensor is used to optically detect the shake of the camera, the costs of the camera shake correction system can be reduced. And, since the camera shake is detected in accordance with the object light incident through the mirror, the feedback control of the mirror can be realized without using an angle sensor for detecting the angle of the mirror. In addition, the invention is advantageous in that the camera shake correction can be enforced without increasing the size of the mirror.

Further, according to the invention, the drift component contained in the output of the angular speed sensor for camera shake detection can be eliminated and, because there is no need for provision of an insensitive area to eliminate the drift component, a small angular speed can be detected as well. Also, sudden change in the drift component can be prevented in detecting the drift component based on calculation of an average value, and a memory capacity necessary in the average value calculation can be reduced to a great extent.

Moreover, according to the invention, due to the fact that the speed of the piezo-electric element for driving the camera shake correction optical member can be controlled by controlling the amount of electric charges injected per unit time by use of an open loop, there is eliminated the need for provision of a sensor or the like to detect a feedback value. Also, since the shift of the piezo-electric element follows linearly the amount of electric charges injected, the optical member can be controlled so that the speed of the optical member is proportional to the angular speed without having any feedback loop and thus an excellent camera shake correction can be realized.

Further, according to the invention, due to the fact that slight electric charges are injected alternately into the piezo-electric element when the camera stands still, the piezo-electric element can be returned quickly to the center of the operating range thereof, whereby it is possible to solve a problem that the camera shake correction is limited by the movable range of the optical member.

Still further, according to the invention, due to the fact that two independent control systems in the X direction and in the Y direction are signal processed in a time sharing manner, only a single signal process means can be used for the two control systems, and A/D converter, a CPU, and a pulse generation circuit can be respectively composed of a 1-chip integrated circuit, and, in spite of the time sharing calculation, pulse electric charges can be injected successively, thereby realizing the smooth speed control in the X and Y directions.

In addition, according to the invention, because the camera shake correction part and the wide converter part are arranged in front of the taking lens and in such a manner that they can be switched to each other, when using the taking lens on the tele side (that is, when the picture image is blurred greatly), the present system is switched to the camera shake correction part to thereby be able to stabilize the object light incident on the image pickup surface and, when using the taking lens on the wide side, the present system is switched to the wide converter part to thereby be able to cover a wide picture angle. This eliminates the need for the mirror to cover a wide picture angle and thus the mirror can be made compact. Also, since a mirror is provided in the wide converter part as well, the picture image will never be inverted, for example, upside down, downside up or the like even if the above-mentioned switching is performed and, therefore, there is no need to change the holding position of the camera.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera shake correction system, comprising:
   a mirror;
   a mirror support mechanism for supporting said mirror in front of a taking lens of a camera in such a manner that said mirror is inclined about an angle of about 45° with respect to the optical axis of said taking lens;
   a mirror drive means for inclining said mirror;
   a shake sensor for detecting the shake of said camera; and,
   a control means, in accordance with the detection output of said shake sensor, for controlling said mirror drive means so as to stabilize an object light incident on the image pickup surface of said camera.

2. A camera shake correction system as set forth in claim 1, wherein said mirror support mechanism includes a chassis fixed in front of said taking lens at an angle of about 45° with respect to the optical axis of said taking lens, a ball interposed between the back surface of said mirror and said chassis, and a spring member for pressing said mirror against said chassis through said ball by means of the resiliency thereof.

3. A camera shake correction system as set forth in claim 2, wherein said mirror drive means has two piezo-electric elements for varying a clearance between said chassis and mirror.

4. A camera shake correction system as set forth in claim 3, wherein said two piezo-electric elements are two bimorphs, and said two bimorphs are arranged in a cantilevered manner on said chassis in parallel to each other and also intersect perpendicularly with each other.

5. A camera shake correction system as set forth in claim 4, wherein said mirror drive means includes two power transmission means to be driven by the respective leading ends of said two bimorphs, and said two power transmission means are disposed at the positions of the two base angles of a right-angled isosceles triangle having a vertical angle identical with the center of said ball.

6. A camera shake correction system as set forth in claim 5, wherein said two power transmission means include two power transmission reference points to said mirror, and said two power transmission reference points are arranged so as to situated substantially on a plane passing through the center of said ball and parallel to said mirror.

7. A camera shake correction system as set forth in claim 1, wherein said shake sensor comprises an angular speed sensor using a Coriolis force, an average value detection means for calculating an average value of the outputs of said angular speed sensor within a predetermined time, said predetermined time being shorter than the cycle of a drift component included in the output of said angular speed sensor and longer than the cycle of the angular speed of the shake of said camera, and a subtraction means for subtracting the average value calculated by said average detection means from the output of said angular speed sensor and outputting the resultant value.

8. A camera shake correction system as set forth in claim 3, wherein said shake sensor is an angular speed sensor for outputting a voltage signal proportional to the angular speed of said camera, and wherein said control means, in accordance with the voltage signal output from said angular speed sensor, injects electric charges into said piezo-electric elements in such a manner that the amount of electric charges injected per unit time is proportional to the magnitude of said electric signal.

9. A camera shake correction system as set forth, comprising:
   a mirror;
   a mirror support mechanism for supporting said mirror in front of a taking lens of a camera in such a manner that said mirror is inclined about an angle of about 45° with respect to the optical axis of said taking lens, and;
   a mirror drive means for inclining said mirror;
   a shake sensor having photo-electric conversion elements disposed in the neighborhood of said taking lens, and an optical system for forming on said photo-electric conversion elements the image of an object light entering through said mirror; and,
   a control means, in accordance with the detection output of said shake sensor, for calculating the amount of movements of an object light formed on said photo-electric conversion elements of said shake sensor every until time, and for controlling said mirror drive means so that said amount of movements of said object light can be zero.

10. A camera shake correction system, comprising:
    a camera shake correction part comprising a first mirror, a mirror support mechanism for supporting said first mirror in such a manner that said first mirror is inclined about an angle of about 45° with respect to the optical axis of a taking lens, a mirror drive means for inclining said first mirror, a shake sensor for detecting the sake of a camera, and a control means, in accordance with the detection output of said shake sensor, for controlling said mirror drive means so as to stabilize an object light incident on the image pickup surface of said camera;

a wide converter part having a second mirror disposed at an angle of about 45° with respect to the optical axis of said taking lens for widening the picture angle of said taking lens; and, a switching unit containing therein said camera shake correction part and wide converter part, disposed movably in front of said taking lens, and movable between a first position allowing an object light to enter said taking lens through said first mirror and a second position allowing an object light to enter said taking lens through said second mirror.

11. A camera shake correction system in which at least one of optical members of a photographing optical system of a camera is movably arranged, and said optical member is driven to stabilize an object light incident on an image pickup surface through the photographing optical system, said camera shake correction system comprising:

a piezo-electric element for driving said optical member;

an angular speed sensor for outputting a voltage signal proportional to the angular speed of said camera; and, an electric charge injection means, in accordance with the voltage signal output from said angular speed sensor, for injecting electric charges into said piezo-electric element so that the amount of electric charges to be injected per unit time is proportional to the magnitude of said voltage signal.

12. A camera shake correction system as set forth in claim 11, wherein said electric charge injection means comprises an A/D converter for converting a voltage signal output from said angular speed sensor into a digital value at a predetermined cycle, a central processing unit for inputting the digital value converted by said A/D converter and outputting a pulse signal having a pulse rate proportional to the magnitude of said digital value until the next digital value is input and the data processing in accordance with said next digital value is completed, and a drive circuit for increasing the voltage of the pulse signal output from said central processing unit and outputting said voltage increased pulse signal to said piezo-electric element.

13. A camera shake correction system in which at least one of optical member of a photographing optical system of a camera is movably arranged, and said optical member is driven in such a manner that said optical member is rotated respectively in first rotational direction (X direction) and in a second rotational direction (Y direction) about two axes intersecting perpendicularly with an optical axis and with each other, said camera shake correction system comprising:

first and second piezo-electric elements for driving said optical member respectively in said X and Y directions;

first and second angular speed sensors respectively for outputting first and second voltage signals respectively proportional to the angular speed in said X and Y directions of said camera;

a signal process means for processing two systems in the X and Y directions, said signal process means inputting alternately every predetermined cycle first and second voltage signals respectively output from said first and second angular speed sensors, finding first and second electric charge injection amount information in accordance with said input first and second voltage signals so that the amounts of electric charges injected into said first and second piezo-electric elements per unit time are respectively proportional to said first and second voltage signals, and outputting said first and second electric charge injection amount information alternately; and, first and second pulse electric charge injection means, when said first and second electric charge amount information output from said signal process means is input thereto, for injecting on pulse electric charges corresponding to said input first and second electric charges amount information into said first and second piezo-electric element until the next first and second electric charge amount information is input, respectively.

14. A camera shake correction system as set for in claim 13, wherein said signal process means comprises an A/D converter for converting alternately the first and second voltage signals respectively output from said first and second angular speed sensors into first and second digital values at a predetermined cycle, and a central processing unit for inputting the first and second digital values converted by said A/D converter and outputting alternately said first and second electric charge amount information respectively representing pulse rates or pulse widths proportional to the magnitudes of said first and second digital values.

15. A camera shake correction system as set forth in claim 14, wherein said pulse electric charge injection means comprises first and second pulse generation means which, when the first and second electric charge injection amount information output from said signal process means is input thereto, respectively generate on first and second pulse signals having pulse rates or pulse widths corresponding to said input first and second electric charge injection amount information until the next first and second electric charge injection amount information is input, and a drive circuit which increase the voltages of the first and second pulse signals respectively output from said first and second pulse generation means and then outputs said voltage-increased, first and second pulse signals to said first and second piezo-electric elements.

16. In a camera shake correction system in which at least one optical member of a photographing optical system of a camera is movably arranged and said optical member is driven in accordance with the detection output of a shake sensor for detecting the shake of the camera to stabilize an object light incident on an image pickup surface through the photographing optical system, said shake sensor comprising: an angular speed sensor using a Coriolis Force; an average value detection means for finding the average value of the outputs of said angular speed sensor within a predetermined time shorter than the cycle of a drift component contained in the output of said angular speed sensor and longer than the cycle of the angular speed of said camera shake to be detected; and, a subtraction means for subtracting the average value found by said average value detection means from the output of said angular speed sensor and outputting the resultant value.

17. A camera shake correction system as set forth in claim 16, wherein said average value detection means comprises a first operation means, each time the number of samplings of the outputs of said angular speed sensor reaches a predetermined number, M, calculates the average of said M samplings, and a second operation means, when the number of the averages calculated by said first operation means reaches a predetermined number, N, calculates the average of said N samplings and thereafter calculates the average of the newest N samplings each time a new average value is calculated by said first operation means.

18. A camera shake correction system in which at least one optical member of a photographing system of a camera is movably arranged and said optical system is driven to stabilize an object light incident on an image pickup surface through the photographing system, said camera shake correction system comprising:

a piezo-electric element for driving said optical member;

an angular speed sensor for outputting a voltage signal proportional to the angular speed of said camera;

decision means for deciding whether the voltage signal output from said angular speed sensor is equal to or less than a predetermined threshold value to indicate that no camera shake correction is required; and, an electric charge injection means, if the voltage signal output from said angular speed sensor is found more than said predetermined threshold value, for injecting electric charges into said piezo-electric element in accordance with said voltage signal so that the amount of electric charges injected per unit time is proportional to the magnitude of said voltage signal, and, if said voltage signal is found equal to or less than said predetermined threshold value, for injecting positive and negative slight electric charges alternately into said piezo-electric element.

* * * * *

UNITED STATES PATENT AND TRADEMARK OFFICE
CERTIFICATE OF CORRECTION

PATENT NO. : 5,041,852

DATED : August 20, 1991

INVENTOR(S) : Atsushi MISAWA et al

It is certified that error appears in the above-identified patent and that said Letters Patent is hereby corrected as shown below:

Title page:

Item "[73]", change "Fjui" to --Fuji--.

Please add the following foreign application priority data as follows:

--[30] Foreign Application Priority Data

| Oct. 20, 1989 | [JP] | Japan | 1-273466 |
| Mar. 1, 1990 | [JP] | Japan | 2-51285 |
| Mar. 12, 1990 | [JP] | Japan | 2-61833 |
| Jan. 22, 1990 | [JP] | Japan | 2-12266 |
| Sept. 20, 1990 | [JP] | Japan | 2-251510 |
| Sept. 20, 1990 | [JP] | Japan | 2-251511 |
| Sept. 26, 1990 | [JP] | Japan | 2-256227 |
| Sept. 26, 1990 | [JP] | Japan | 2-256228 |
| Oct. 4, 1990 | [JP] | Japan | 2-267038-- |

Signed and Sealed this

Twenty-third Day of March, 1993

Attest:

STEPHEN G. KUNIN

Attesting Officer     Acting Commissioner of Patents and Trademarks